US 6,580,678 B2

(12) United States Patent
Kondo et al.

(10) Patent No.: US 6,580,678 B2
(45) Date of Patent: Jun. 17, 2003

(54) REWRITABLE COMPACT DISK AND MANUFACTURING METHOD THEREOF

(75) Inventors: Joji Kondo, Kanagawa (JP); Masae Kubo, Kanagawa (JP); Hideyuki Kubo, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 25 days.

(21) Appl. No.: 09/849,462

(22) Filed: May 4, 2001

(65) Prior Publication Data

US 2001/0038603 A1 Nov. 8, 2001

Related U.S. Application Data

(63) Continuation of application No. PCT/JP00/06157, filed on Sep. 8, 2000.

(30) Foreign Application Priority Data

Sep. 8, 1999 (JP) ............................................ 11-254117

(51) Int. Cl.[7] .................................................. G11B 7/24
(52) U.S. Cl. .................................. 369/275.2; 369/275.4
(58) Field of Search .......................... 369/275.4, 275.3, 369/275.2, 275.1, 13.46, 13.51, 13.35, 13.38, 47.53, 47.5, 53.1, 53.37, 44.26; 428/694 ML, 64.4, 64.3

(56) References Cited

U.S. PATENT DOCUMENTS

| | | |
|---|---|---|
| 4,734,904 A | 3/1988 | Imanaka |
| 4,982,398 A | 1/1991 | Yamamoto et al. |
| 5,090,007 A | 2/1992 | Bulthuis |
| 5,105,404 A | 4/1992 | Ohira |
| 5,204,852 A | 4/1993 | Nakagawa et al. |
| 5,214,627 A * | 5/1993 | Nakashima et al. ..... 369/275.3 |
| 5,583,847 A | 12/1996 | Takeshima et al. |
| 5,688,574 A | 11/1997 | Tamura et al. |
| 5,793,741 A | 8/1998 | Kashihara et al. |
| 5,812,519 A * | 9/1998 | Kawamura et al. ...... 369/275.1 |
| 6,004,646 A | 12/1999 | Ohno et al. |
| 6,031,808 A * | 2/2000 | Ueno ......................... 369/111 |
| 6,103,407 A * | 8/2000 | Izumi et al. ......... 428/694 ML |

FOREIGN PATENT DOCUMENTS

| | | |
|---|---|---|
| EP | 0 301 865 | 2/1989 |
| EP | 0 414 429 | 2/1991 |
| EP | 674309 | 9/1995 |

(List continued on next page.)

Primary Examiner—Ali Neyzari
(74) Attorney, Agent, or Firm—Katten Muchin Zavis Rosenman

(57) ABSTRACT

To provide a rewritable compact disk having a rewritable area interchangeable with a CD-RW, that is, a RAM area (105), and an area available only for retrieving, that is, a ROM area (104), on the same disk surface, a phase-change recording layer is formed in each of the RAM area and the ROM area, with a wobble groove being made in the RAM area, irradiation is carried out with recording light so that an amorphous mark is formed to record information and information is recorded in the form of a pre-pit string (60) in the ROM area, and further when measured using a wavelength of 770 to 790 nm and an optical pickup whose objective lens numerical aperture is 0.49 to 0.51, a ratio $|I_1-I_2|/|I_1-I_2|_a$ of values of push pull signals before and after recording in the RAM area is set to be in a range from 1.05 to 2.0, or a ratio $|I_1-I_2|_a/|I_1-I_2|_{ROM}$ of a value of a push pull signal after recording in the RAM area to a value of a push pull signal in the ROM area is set to be in a range from 0.78 to 1.3.

15 Claims, 14 Drawing Sheets

FOREIGN PATENT DOCUMENTS

| | | |
|---|---|---|
| EP | 740289 | 10/1996 |
| EP | 867868 | 9/1998 |
| JP | 62-60735 | 12/1987 |
| JP | 63-263647 | 10/1988 |
| JP | 2-126436 | 5/1990 |
| JP | 3-241538 | 10/1991 |
| JP | 5-12680 | 1/1993 |
| JP | 7-73509 | 3/1995 |
| JP | 7-70089 | 7/1995 |
| JP | 7-107744 | 11/1995 |
| JP | 7-311981 | 11/1995 |
| JP | 7-122935 | 12/1995 |
| JP | 8-7883 | 1/1996 |
| JP | 8-55367 | 2/1996 |
| JP | 8-63794 | 3/1996 |
| JP | 8-161750 | 6/1996 |
| JP | 8-212550 | 8/1996 |
| JP | 08-212550 | 8/1996 |
| JP | 8-293129 | 11/1996 |
| JP | 8-329521 | 12/1996 |
| JP | 9-138977 | 5/1997 |
| JP | 9-245377 | 9/1997 |
| JP | 10-172149 | 6/1998 |
| JP | 10-326436 | 12/1998 |

* cited by examiner

REWRITABLE COMPACT DISK AND MANUFACTURING METHOD THEREOF

This application is a continuation of international application No. PCTJP00/06157, filed Sep. 8, 2000.

TECHNICAL FIELD

The present invention relates to an optical disk for recording/retrieving information through laser light and a manufacturing method thereof, and more particularly to a rewritable compact disk having a ROM area available only for retrieving and a rewritable RAM area, and a manufacturing method thereof.

BACKGROUND ART

In the recent years, in addition to audio CD or CD-ROM, CD-R (CD-Recordable) or CD-RW (CD-Rewritable) has been put on the market as recordable media interchangeable with these, and has come into widespread use.

This group is referred to as a CD family, and among media available only for retrieving, there are CDDA, CD-ROM, CD-ROMXA, CDV, CD-I, CD-MIDI and others. The CDDA is a so-called music CD. In the following description, these will sometimes be referred to generically as CD available only for retrieving.

In these CDs available only for retrieving, embossed pit strings including information are previously formed on a substrate made of a translucent polycarbonate or the like by means of a press or the like, and a reflective layer comprising a metallic film made of a precious metal, Al or the like is formed on the pit formed surface, and further a protective layer made of a photo-curing resin is formed thereon. These CDs available only for retrieving have come into widespread use for the purpose of storing and retrieving music, image, data, program and others. The specification on recording on this CD and retrieved signals is prescribed as the CD standard, and a retrieving apparatus according to this standard have become widespread in the form of CD players.

The CD-R or CD-RW, by contrast, is a medium writable by a user. Data on the CD-R is retrievable through a CD-ROM drive mounted in a personal computer or a CD player, but data is writable only once thereon, with the data once recorded being inerasable.

On the other hand, data on the CD-RW is retrievable only by a CD-RW handling drive because of a lower reflectance than that of a CD available only for retrieving but is rewritable more than 1000 times unlike the CD-R.

This CD-RW is a kind of phase-change optical disk, and an inorganic protective layer, a phase-change recording layer, an inorganic protective layer and a reflective layer are piled up in this order on a transparent resin substrate on which a guide groove is formed in advance, and further a protective layer made of a photo-curing resin is formed thereon.

The entire surface of the recording layer is once treated into a crystalline to establish an erased condition. For recording, a recording layer in a guide groove is irradiated with high-power laser light to change the crystalline of the recording layer so that an amorphous mark is formed to produce a reflectance variation with respect to a laser non-irradiated portion. The formed mark portion is irradiated with low-power laser light to detect a variation in reflectance, thereby retrieving the information recorded. That is, the recorded mark is substantially equivalent in function to a pit in the aforesaid CD available only for retrieving.

The CD available only for retrieving has an advantage in that it can supply a large volume of application software or the like at a low cost, but it rejects writing. On the other hand, as mentioned above, the CD-RW accepts the writing and functions as large-capacity record media, and has the format content normalized, coupled with being excellent in interchangeability with the CD available only for retrieving and very easy to handle, but is unsuitable for supply of a large volume of software at a low cost.

Meanwhile, in general, in a case in which a CD-RW writer is mounted in a personal computer, a CD-ROM or the like is not mounted simultaneously therein, but only the CD-RW writer is mounted therein; therefore, in most case, the CD available only for retrieving and the CD-RW cannot be put in operation at the same time. In this case, for recording the data produced/processed using application software distributed through the CD available only for retrieving, there is a need to once fetch the CD available only for retrieving from the drive for replacing it with a CD-RW.

Accordingly, a problem exists in that the recording of data on a CD-RW through application software distributed by a CD-ROM requires complicated procedures.

As means of solving this problem, there has been known an approach in which application software or the like is previously recorded one by one on a CD-RW through the use of a recording device and then distributed. However, this approach creates a problem in difficulty on mass production of a medium, and encounters a possibility of erasing of the once recorded application software in error, and for this reason, it does not reach a practical solution.

Japanese Examined Patent Publication No. 7-122935 discloses a technique on an optical recording medium having a ROM area and a RAM area on the same plane.

However, the technique disclosed in this publication involves forming an organic material recording film producing a recording layer only on the RAM area serving as a recordable area. In a case in which the film arrangement alters between the RAM area and the ROM area, although it is easy to separately control signal values read out from both the areas, there is a need to form a film in a state where a masking tool is set on each substrate to cover the ROM area, which has a detrimental effect on manufacturing. Moreover, when the position or size of the ROM area changes, there is a need to change the mask accordingly. Therefore, the technique is undesirable also in this respect.

In addition, the column "Problems to be Solved by the Invention" in this Publication says "an application on an optical disk in which a recording layer made of an organic material is formed over an area comprising a ROM area available only for retrieving and a recordable RAM area and which is interchangeable with a compact disk was made as Japanese Patent Application No. 2-36190". However, since the recording layer is made of an organic material and a dye layer is formed even on the ROM area important for information, as mentioned in the column "Problems to be Solved by the Invention" of the Publication, the ROM area tends to come under the influence of optical discoloration of the dye; therefore, this is undesirable.

Still additionally, Japanese Examined Patent Publication No. 7-70089 discloses a technique on an optical information carrying disk in which a recording layer, where information recording depends on variation of crystalline stemming from light irradiation, is provided on a surface of a substrate retaining information recorded in the form of embossed dots.

However, this technique involves a so-called phase-change recording layer, employed in place of a reflective layer in order to achieve partial correction, updating and addition of information, and is remote from formation of a ROM area and a RAM area on the same surface.

DISCLOSURE OF THE INVENTION

The present invention has been developed in consideration of the above-mentioned problems, and it is therefore an object of the invention to provide a rewritable compact disk having a ROM area and a RAM area and a manufacturing method thereof, capable of realizing both utilization of application software or the like and recording of data through the use of one CD-RW writer while maintaining interchangeability with a CD-RW.

In accordance with a first feature of the prevent invention, there is provided a rewritable compact disk having at least a phase-change recording layer on a substrate, characterized in that a recordable, erasable and retrievable RAM area and a ROM area available only for retrieving are provided on the same disk surface, the phase-change recording layer is formed in each of the RAM area and the ROM area and a wobble groove is made in the RAM area, and further a crystalline portion of the phase-change recording layer is made as a non-recorded state/erased state while an amorphous portion thereof is made as a recorded state, with the irradiation being carried with recording light out so that an amorphous mark is formed in the groove to record EFM information, in the ROM area, EFM information is recorded in the form of a pre-pit string, and when measured using a wavelength of 770 to 790 nm and an optical pickup whose objective lens numerical aperture is 0.49 to 0.51, a ratio $|I_1-I_2|/|I_1-I_2|_a$ of values of push pull signals before and after recording of an EFM signal in the RAM area is 1.05 through 2.0, or a ratio $|I_1-I_2|_a/|I_1-I_2|_{ROM}$ of a value of a push pull signal after recording in the RAM area to a value of a push pull signal in the ROM area is 0.78 through 1.3.

Particularly, it is preferable that a modulation amplitude of a 11T signal of the EFM signal in the ROM area is 0.55 through 0.95.

In addition, preferably, a ratio $(m_3/m_{11})$ ROM of a modulation amplitude of a 3T signal of the EFM signal to a modulation amplitude of a 11T signal thereof in the ROM area is equal to or more than 0.45.

Still additionally, preferably, a modulation amplitude of a 11T signal of the EFM signal in the RAM area is 0.60 through 0.90.

Preferably, a ratio $(m_3/m_{11})$ RAM of a modulation amplitude of a 3T signal of the EFM signal to a modulation amplitude of a 11T signal thereof in the RAM area is equal to or more than 0.45.

Moreover, preferably, a ratio $R_{topROM}/R_{topRAM}$ of maximum reflectances of the ROM area and the RAM area is 0.7 through 1.45.

Still moreover, preferably, a radial contrast value in the ROM area is 0.30 through 0.60.

Preferably, a pre-pit string in the ROM area has an wobble. In addition, preferably, a normalized wobble signal $NWS_{ROM}$ obtained from the wobble in the ROM area is 0.035 through 0.060.

Still additionally, preferably, the pre-pit string in the ROM area has a pit depth of 60 to 100 nm and a pit width of 0.45 to 0.70 $\mu$m.

Moreover, preferably, the wobble groove in the RAM area has a groove depth of 30 to 50 nm and a groove width of 0.40 to 0.60 $\mu$m.

In accordance with a second feature of the prevent invention, there is provided a rewritable compact disk having at least a phase-change recording layer on a substrate, characterized in that a recordable, erasable and retrievable RAM area and a ROM area available only for retrieving are provided on the same disk surface, the phase-change recording layer is formed in each of the RAM area and the ROM area and a groove (groove having a wobble) is made in the RAM area, and further a crystalline portion of the phase-change recording layer is made as a non-recorded state/erased state while an amorphous portion thereof is made as a recorded state, with the irradiation being carried out with recording light so that an amorphous mark is formed in the groove to record EFM information, in the ROM area, EFM information is recorded in the form of a pre-pit string, the pre-pit string in the ROM area has a pit depth of 60 to 100 nm and a pit width of 0.45 to 0.70 $\mu$m, and the groove (wobble groove) in the RAM area has a groove depth of 30 to 50 nm and a groove width of 0.40 to 0.60 $\mu$m.

In accordance with a third feature of the present invention, there is provided a preferred method of manufacturing this rewritable compact disk, comprising carrying out irradiation with laser light for exposure according to a pre-pit string and groove to be made in a photoresist film formed on a substrate and developing the photoresist film for producing a master having the formed pre-pit string and groove, producing a stamper on the basis of the master, forming a substrate having the pre-pit string and the groove on the basis of the stamper, and forming a phase-change recording layer thereon, characterized in that, in irradiating the photoresist film with the laser light according to the groove, the irradiation for the exposure is carried out while oscillations are made $2.5 \times 10^6$ times/m or more but $25 \times 10^6$ times/m or less in directions perpendicular to a traveling direction of the laser light.

In accordance with a fourth feature of the present invention, there is provided another preferred method of manufacturing this rewritable compact disk, comprising carrying out irradiation with laser light for exposure according to a pre-pit string and groove to be made in a photoresist film formed on a substrate and developing the photoresist film for producing a master having the formed pre-pit string and groove, producing a stamper on the basis of the master, forming a substrate having the pre-pit string and the groove on the basis of the stamper, and forming a phase-change recording layer thereon, characterized in that, in irradiating the photoresist film with the laser light according to the groove, the irradiation is carried out with a plurality of laser beams for the exposure so that the adjacent laser beams partially overlap in a direction perpendicular to a traveling direction of the laser light.

BRIEF DESCRIPTION OF DRAWINGS

FIG. 6($b$) is an illustrative view for explaining the case in which the groove is made in the ROM area to connect the pits, in the rewritable compact disk according to the embodiment of the present invention, and is a cross-sectional view taken along arrows A—A of FIG. 6($a$).

FIG. 8($b$) is an illustrative view for explaining the case in which the groove is made between the pit strings in the ROM area, in the rewritable compact disk according to the embodiment of the present invention, and is a cross-sectional view taken along arrows B—B of FIG. 8($a$).

FIG. 9($b$) is an illustration for explaining the pit string having the wobble in the rewritable compact disk according to the embodiment of the present invention, and is an illustrative plan view for explaining a configuration of this pit string.

FIG. 11($b$) is an illustrative view for explaining the groove and pit made in the substrate of the rewritable compact disk according to the embodiment of the present invention, and is a cross-sectional view taken along arrows C—C of FIG. 11($a$).

BEST MODE FOR CARRYING OUT THE INVENTION

An embodiment of the present invention will be described hereinbelow with reference to the drawings.

Figure 1:
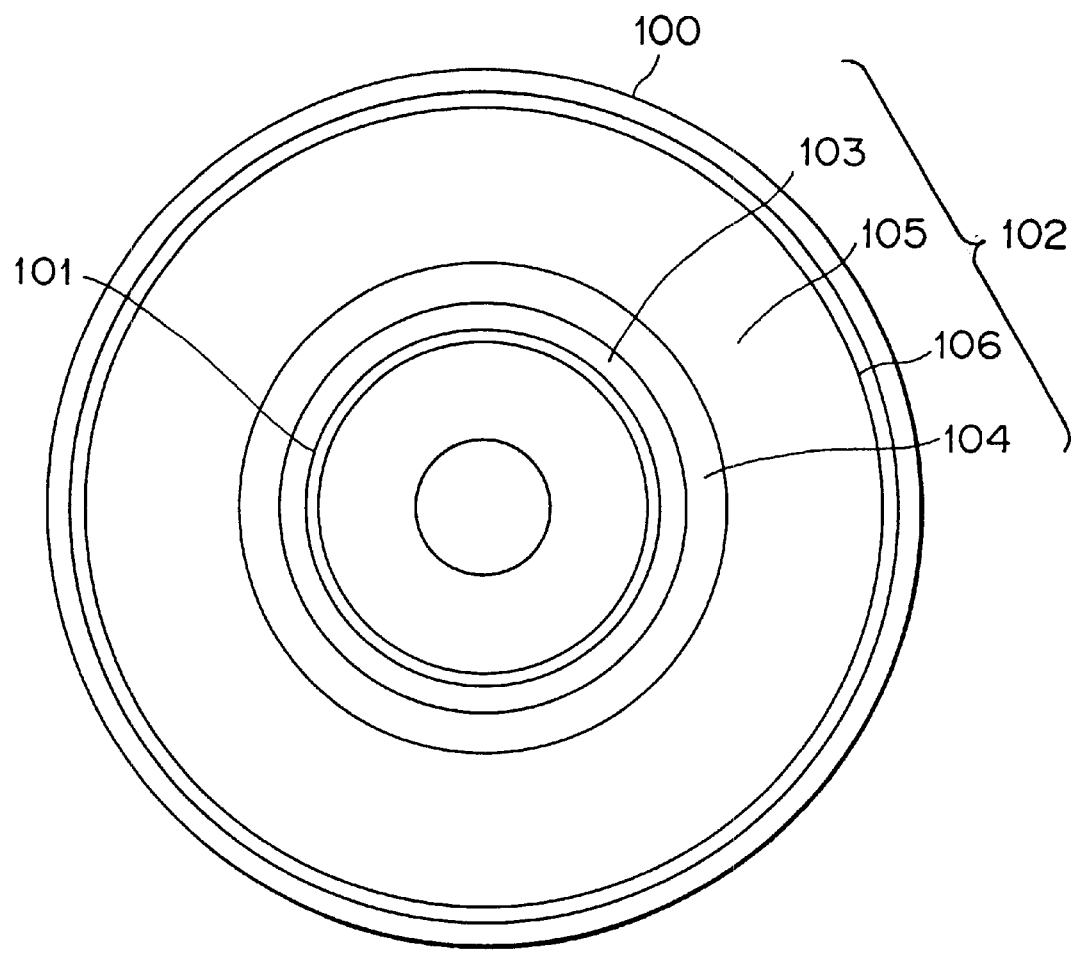
FIG. 1 is an illustration of an example of an arrangement of a non-data area and a data area in a CD-RW forming a rewritable compact disk according to an embodiment of the present invention.

FIG. 1 is an illustration of an example of an arrangement of a non-data area and a data area in a CD-RW forming a rewritable compact disk according to an embodiment of the present invention.

A CD-RW (which will equally be referred to simply as a disk) 100, shown in FIG. 1, is an optically retrievable or recordable recording medium, and is composed of a managing area 101 and a user area 102.

Of these areas, the managing area 101 is an area a drive unit (not shown) can reproduce but a user cannot have access to, and is composed of a PCA (Power Calibration Area) and a PMA (Program Memory Area). The PCA is an area for recording information to adjust the intensity of a laser when data is written. In the PMA, for example, a recording start address at additional writing is recorded temporarily.

Furthermore, the user area 102 is an area the drive unit can read out from, and the user can arbitrarily gain access to. The user area 102 comprises a lead-in area 103 for accommodating a lead-in, a ROM area available only for retrieving 104 from which data is read out by the drive unit (not shown), a RAM area 105 where data is recordable, erasable and retrievable by the drive unit (not shown), and a lead-out area 106 for accommodating a lead-out. Incidentally, the ROM area 104 and the RAM area 105 will sometimes be referred to generically as a data area (program area).

In addition, in the ROM area 104, EFM information is recorded in the form of a pre-pit string. For example, application software, driver software or the like are considered as the information to be recorded in this ROM area 104, but limitation is not particularly imposed on the type of information.

For example, it can also be medium information on a special CD-RW, authentication information, or the like. Through the CD-RW, a user can personally and easily duplicate work data such as music, movie or computer program; therefore, there is a problem in that difficulty is experienced in protecting such work perfectly. As an approach to protect data with such copyright, it is considered that a rental fee is added in advance with respect to the CD-RW and authentication information or the like is recorded in the ROM area 104 for setting up a CD-RW with authentication so that the data with copyright is allowed to be duplicated with respect to only such a CD-RW.

On the other hand, the RAM area 105 has a phase-change recording layer, and a crystalline portion of the phase-change recording layer is made as a non-recorded state/ erased state while an amorphous portion thereof is set up as a recorded state. In this RAM area 105, a guide groove (wobble groove) having a wobble is made so that recording light is applied to the phase-change recording layer while being guided along the wobble groove to form an amorphous mark (recorded mark), thus recording EFM information.

Incidentally, in FIG. 1, although the ROM area 104 is positioned at the innermost circumferential portion of the data area, it is not always required that the ROM area 104 is at the innermost circumference. However, taking easy access or simple manufacturing into consideration, it is preferable that the ROM area 104 is positioned at the innermost or outermost circumference of the data area. In addition, attaching importance to the interchangeability with the CD-RW of only the RAM area, it is preferable the innermost circumference of the data area is set as the RAM area.

In addition, preferably, a buffer area which is not used for data recording/retrieving is provided at the boundary portion between the ROM area 104 and the RAM area 105. This can cut off the logical connection of data and can prevent the tracking or recording/retrieving from becoming infeasible due to the difference between the groove/pit signal characteristics of both the areas As a preferred example, there is a manner using a multi-session method prescribed in the ISO9660 so that the ROM area and the RAM area are set as separate sessions. In this case, for example, a lead-in area, a ROM area. a lead-out area. a lead-in area, a RAM area, a lead-out area . . . are disposed in order starting from the innermost circumference so that the lead-out area and the lead-in area always exist between the ROM area and the RAM area. Therefore, the lead-out area and the lead-in area are available as a buffer area. In general, if having a length corresponding to one minute (a length which needs approximately one minute for retrieving) when retrieving is made at a linear velocity of 1.2 m/s, the lead-out area and the lead-in area functions sufficiently as the buffer area.

Alternatively, it is also possible that a UDF format (Universal Disk Format) is employed and a specified packet group is allocated to the ROM area.

Meanwhile, in the CD-RW 100 according to this embodiment, a phase-change recording layer is provided not only on the RAM area 105 but also on the ROM area 104.

Figure 2:
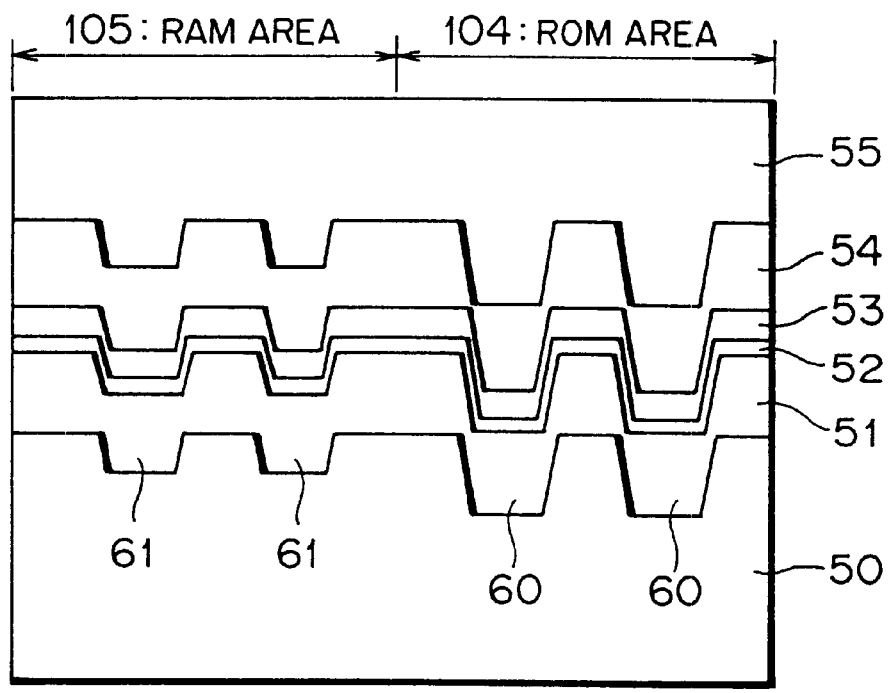
FIG. 2 is an illustrative cross-sectional view showing the rewritable compact disk according to the embodiment of the present invention.

Concretely, as FIG. 2 shows, at least a phase-change recording layer 52 is formed on a substrate 50 to cover the entire area of the managing area 101 and the user area 102. Preferably, a protective layer 51, the phase-change recording layer 52, a protective layer 53 and a reflective layer 54 are placed in this order on the substrate 50, and further a protective coat layer 55 such as an ultraviolet-curing resin or a thermoset, having a thickness of approximately 1 $\mu$m to approximately several hundreds $\mu$m, is provided on the uppermost layer in order to prevent the direct contact with the air or prevent damages stemming from contact with foreign matters.

As stated above, according to this embodiment, the ROM area 104 is also made to have the same layer structure as that of the RAM area 105.

In addition, as FIG. 2 shows, a pit string (pre-pit string) comprising a plurality of pits (pre-pits) 60 is made in the ROM area 104 of the substrate 50, and a guide groove 61 is made in the RAM area 105 thereof.

For conducting recording/retrieving on an optical disk having the ROM area 104 and the RAM area 105 through the use of one drive unit, there is a need to optimize the groove signal characteristic (for example, tracking signal characteristic) and the retrieved signal characteristic in each of the ROM area 104 and the RAM area 105. In addition to this, at the change-over portion between the ROM area 104 and the RAM are 105, it is also important to secure the sufficient continuity of the groove signal and the retrieved signal and to optimize the groove signal characteristic (for example, tracking signal characteristic) and the retrieved signal characteristic.

In the following description, in this embodiment, let it be assumed that the various types of signals are measured using a wavelength of 770 nm to 790 nm and an optical pickup whose objective lens numerical aperture NA is 0.49 to 0.51. These measurement conditions are basically determined according to the CD-RW orange book standard. However, the objective lens numerical aperture NA used is not 0.44 to 0.46 (approximately 0.45), but is 0.49 to 0.51 (approximately 0.50).

As a result of a diversity of studies by this inventors and other people, of the various characteristics, it was found that the groove signal characteristic (tracking signal characteristic) depends most greatly upon a value of a push pull signal.

That is, the ratio $|I_1-I_2|/|I_1-I_2|_A$ of a value of a push pull signal before recording of an EFM signal in the RAM area 105 to a value of a push pull signal after the recording of an EFM signal in the RAM area 105 is preferable to be in a range from 1.05 to 2.0.

When it is set to be in this range, it is possible to optimize the groove signal characteristic (tracking signal characteristic) in the RAM area 105. In addition, this optimizes the retrieved signal characteristic.

Furthermore, the ratio $|I_1-I_2|_a/|I_1-I_2|_{ROM}$ of a value of a push pull signal after recording of the EFM signal in the RAM area 105 to a value of a push pull signal in the ROM area 104 is in a range from 0.78 to 1.3.

When it is set in this range, since it is possible to provide a sufficient continuity of signals (groove signal or retrieved signal) at the change-over portion between the ROM area 104 and the RAM area 105, the operation can be conducted in the dynamic range of the tracking servo of a drive (drive unit), which enables continuous recording/retrieving in the ROM area 104 and the RAM area 105 in one drive unit. Therefore, it is possible to optimize the groove signal characteristic (tracking signal characteristic) and the retrieved signal characteristic at the change-over portion between the ROM area 104 and the RAM area 105.

In this connection, when setting is made to satisfy both the above-mentioned ranges, although the ratio $|I_1-I_2|/|I_1-I_2|_{ROM}$ of a value of a push pull signal before recording of an EFM signal in the RAM area 105 to a value of a push pull signal in the ROM area 104 is preferable to be between 0.82 (1.05×0.78) to 2.6 (2.0×1.3), most preferably, of this range, the ratio is in a range from 1.05 to 2.0.

Incidentally, since the objective lens numerical aperture NA is changed from 0.45 to 0.50 as mentioned above, even the identical laser light tends to be further focused to reduce the diameter of a laser beam with which the disk 100 is irradiated. Although the values of push pull signals tend to somewhat increase for this reason, in this case, since division is made with respect to these values to calculate the ratio of these values, no problem exists even if the change of the objective lens numerical aperture NA causes the variation of each value of push pull signals.

Figure 3:
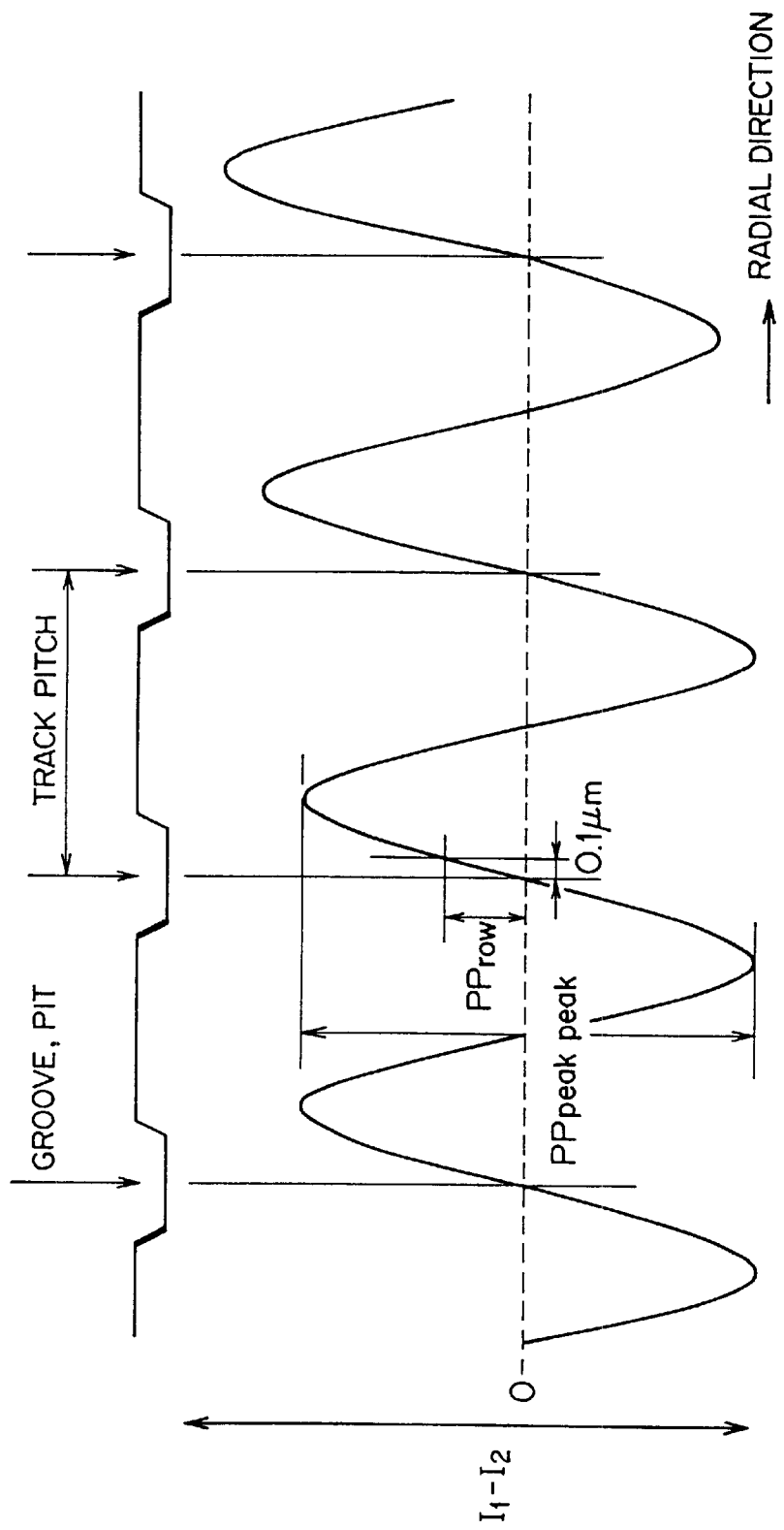
FIG. 3 is an illustration for explaining a push pull signal on the rewritable compact disk according to the embodiment of the present invention.

Referring to FIG. 3, a description will be given hereinbelow of the values of push pull signals to be taken here.

In this case, the retrieving from the optical disk is usually made by receiving reflected light of a light spot traveling together with a head or a pickup, and the tracking error signal can be obtained by arithmetically processing, in a signal processing circuit, an output $I_1$ from a first light-receiving element of an optical detector comprising two light-receiving elements (two photo diodes; 2D-PD) constructed by dividing the optical detector into two sections along a radial direction of the optical disk and an output $I_2$ from the second light-receiving element thereof. FIG. 3 shows an $I_1-I_2$ signal obtained by arithmetically processing a retrieved signal (that is, a retrieved signal with no tracking error) retrieved without using the tracking.

In addition, the absolute value of the difference between the signal values obtained when a quantity of light reflected from the disk 100 is measured by the two divided light-receiving elements is expressed as $|I_1-I_2|$.

Still additionally, after the recording in the RAM area 105, the absolute of the difference between the signal values obtained by measuring the quantity of light reflected from the disk 100 through the use of the aforesaid two divided light-receiving elements is expressed as $|I_1-I_2|_a$.

In the ROM area 104, the absolute value of the difference between the signal values obtained by measuring the quantity of light reflected from the disk 100 through the use of the aforesaid two divided light-receiving elements is expressed as $|I_1-I_2|_{ROM}$.

In this case, since $|I_1-I_2|_a$ and $|I_1-I_2|_{ROM}$ vary largely depending on the recorded signal, a signal obtained by once passing the outputted signal through a 5-kHz low-pass filter is put to use.

Since these respectively correspond to the values of push pull signals before the normalization, for example, the ratio of a value of a push pull signal before the recording of an EFM signal in the RAM area 105 to a value of a push pull signal after the recording thereof can be expressed as $|I_1-I_2|/|I_1-I_2|_a$. In addition, the ratio of a value of a push pull signal after the recording an EFM signal in the RAM area 105 to a value of a push pull signal in the ROM area 104 can be expressed as $|I_1-I_2|_a/|I_1-I_2|_{ROM}$.

Since the value of a push pull signal signifies a value varying in accordance with a position in a radial direction from the center of a groove (or a pit), the foregoing comparison is made using the maximum values of the signal values.

Incidentally, although the value of a push pull signal varies in accordance with the multilayer structure such as a recording layer or the external environment, it is possible to eliminate such variation by the normalization involving the division by another signal, and to evaluate the signal value itself.

Secondly, a description will be given hereinbelow of a value of a push pull signal after the normalization.

First, a value $|I_1-I_2|/I_g$ obtained by dividing $|I_1-I_2|$ (corresponding to $PP_{raw}$ in FIG. 3) in the case of shifting by 0.1 μm in a radial direction from the center of a groove by a groove signal level $I_g$ before recording in the RAM area 105 is referred to as a value of a push pull before recording under the normalization made with the groove signal level $I_g$. The groove signal level $I_g$ is equivalent to a bottom level of an $I_1-I_2$ signal.

Furthermore, a value $|I_1-I_2|_a/I_{ga}$ obtained by dividing $|I_1-I_2|_a$ (corresponding to $PP_{raw}$ in FIG. 3) in the case of shifting by 0.1 μm in a radial direction from the center of a groove by an average groove signal level $I_{ga}$ after recording in the RAM area 105 is referred to as a value of a push pull after recording under the normalization made with the average groove signal level $I_{ga}$.

At this time, since the groove signal level varies largely depending on the recorded signal, with respect to the average groove signal level $I_{ga}$ after the recording, the bottom level of a signal obtained by once passing the $(I_1-I_2)a$ signal through a 5-kHz low-pass filter is used.

In this connection, it is also possible to use, as the ratio of the value of a push pull signal before the recording of the EFM signal in the RAM area 105 and the value of a push pull signal after the recording thereof, a ratio $(|I_1-I_2|/I_g)/(|I_1-I_2|_a/I_{ga})$ of the foregoing values normalized. In this case, it is preferable that $(|I_1-I_2|/I_g)/(|I_1-I_2|_a/I_{ga})$ is 0.5 through 1.3.

A value $|I_1-I_2|_a/I_{topRAM}$ obtained by dividing $|I_1-I_2|_a$ (corresponding to $PP_{raw}$ in FIG. 3) in the case of shifting by 0.1 μm in a radial direction from the center of a groove by a maximum level $I_{topRAM}$ of a retrieved signal corresponding to a 11T signal of an EFM signal after recording in the RAM area 105 is referred to as a value of a push pull signal after recording normalized with a maximum signal level $I_{topRAM}$.

The value $|I_1-I_2|_a/I_{topRAM}$ of a push pull signal after recording normalized with the maximum signal level $I_{topRAM}$ in the RAM area 105 is ordinarily in a range from 0.07 to 0.120, more preferably, 0.080 through 0.100.

In the ROM area 104, a value $|I_1-I_2|_{ROM}/I_{topROM}$ obtained by dividing $I_1-I_2|_{ROM}$ (corresponding to $PP_{raw}$ in FIG. 3) in the case of shifting by 0.1 μm in a radial direction from the center of a pit string 60 by a maximum level $I_{topROM}$ of a retrieved signal corresponding to a 11T signal of an EFM signal in the ROM area 104 is referred to as a value of a push pull signal in the ROM area 104 normalized with a maximum signal level $I_{topROM}$.

The value $|I_1-I_2|_{ROM}/I_{topROM}$ of a push pull signal in the ROM area 104 normalized with a maximum signal level $I_{topROM}$ is ordinarily 0.020 (more preferably, 0.04 and over) through 0.070.

The reason that the range of the value of a push pull signal normalized with the maximum signal level is set as mentioned above is because, if the value of a push pull signal is excessively small, then the tracking does not act normally. On the other hand, an over-value also creates a problem. That is, since the drive is made to return an optical head to a normal tracking position with a force proportional to a value of a push pull signal, if the value of the push pull signal is too large, then the overshoot increases, which causes the tracking to the normal position to be difficult.

Meanwhile, of the groove signal characteristic (for example, tracking signal characteristic), a value of a radial contrast is also important.

Preferably, this radial contrast value is 0.30 through 0.60 in the ROM area 104. If the value is out of this range, difficulty is experienced in accurately conducting the track count at seek. In addition, in the case of the excessive radial contrast value, depending on drive, there is a possibility that the track is recognized as a flaw in error.

Preferably, the radial contrast value $RC_b$ at a guide groove before recording in the RAM area 105 is set to be 0.05 and over, while the radial contrast value $RC_a$ at a guide groove after recording of an EFM signal is set to be 0.30 through 0.60 (more preferably, 0.55 and below). This can maintain the continuity to the radial contrast value in the ROM area 104.

The radial contrast values in the ROM area 104, before recording in the RAM area 105 and after recording in the RAM area 105 are defined by the following equations (1), (2) and (3), respectively.

$$RC_{ROM} = 2 \times \frac{I_{LAND} - I_{PIT}}{I_{LAND} + I_{PIT}} \quad (1)$$

$$RC_b = 2 \times \frac{I_l - I_g}{I_l + I_g} \quad (2)$$

$$RC_a = 2 \times \frac{I_{la} - I_{ga}}{I_{la} + I_{ga}} \quad (3)$$

A land level and pit level of a retrieved signal are taken as $I_{LAND}$ and $I_{PIT}$, respectively, and a land level and group level of a groove signal before recording in the RAM area 105 are taken as $I_l$ and $I_g$, respectively, and further, a land level and group level of a groove signal after recording in the RAM area 105 are taken as $I_{la}$ and $I_{ga}$, respectively. A retrieved signal of the ROM area 104 and a groove signal of the RAM area 105 are average signals obtained by passing a retrieved signal and a groove signal through a 5-kHz low-pass filter. Both are measured without performing the tracking.

Furthermore, with respect to a retrieved signal characteristic, the modulation amplitude of a 11T signal of an EFM signal is most important, and it is preferable that the modulation amplitude of a 11T signal of an EFM signal in the ROM area 104 is 0.55 through 0.95 (more preferably, 0.60 and over) and the modulation amplitude of a 11T signal of an EFM signal in the RAM area 105 is 0.60 through 0.90 (more preferably, 0.80 and below). This enables information to be read out certainly from both the ROM area 104 and RAM area 105, which secures a necessary information regenerating ability.

Figure 4:
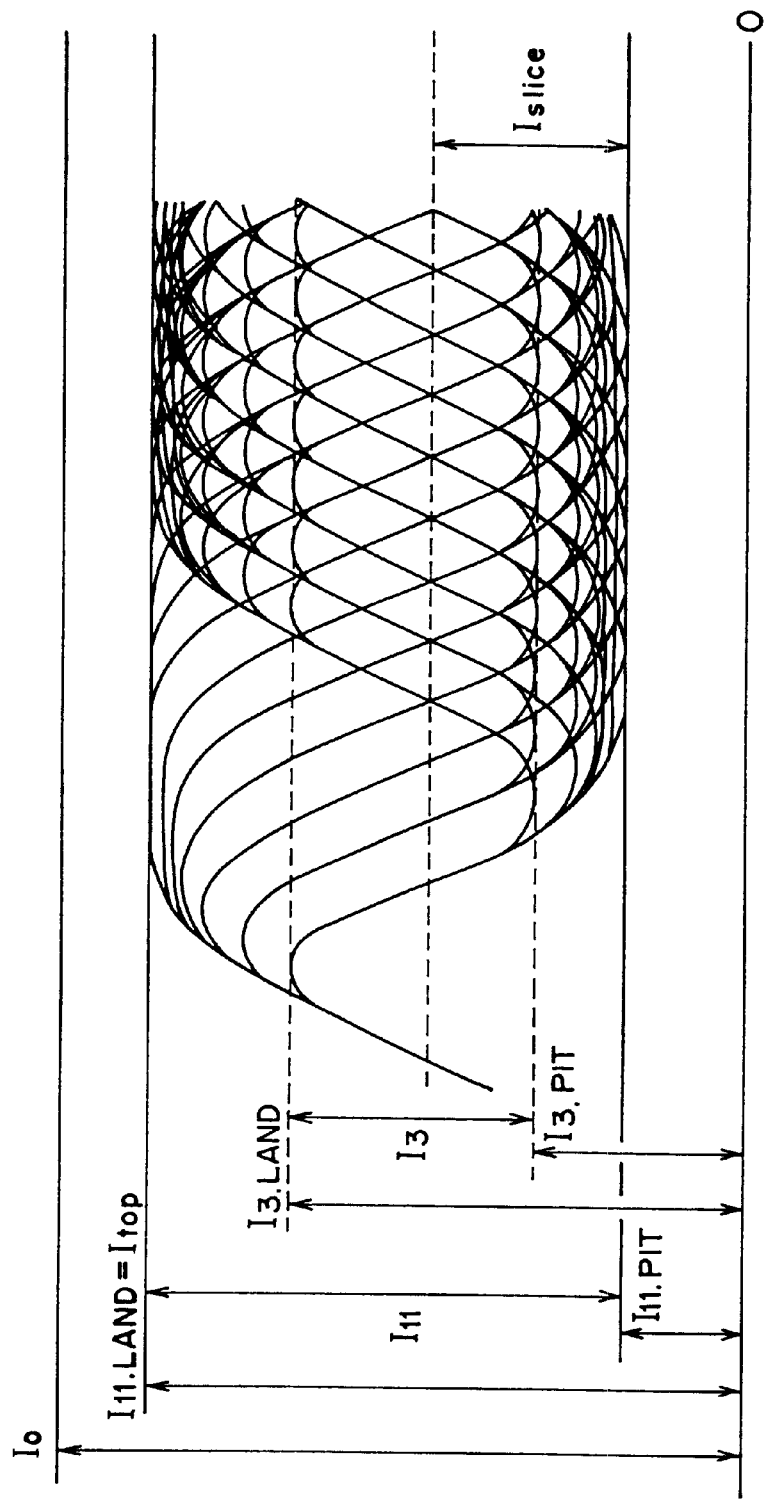
FIG. 4 is an illustration for explaining a retrieved signal from the rewritable compact disk according to the embodiment of the present invention.

Referring here to FIG. 4, a description will be given of a modulation amplitude $m_{11}$ of a 11T signal.

FIG. 4 shows the sum $I_1+I_2$ of signals obtained by measuring a quantity of light reflected from the disk 100 through the use of the aforesaid two divided light-receiving elements when the retrieving from the disk 100 is made under tracking.

In this case, when an amplitude of a retrieved signal corresponding to a 11T signal is taken as $I_{11}$ and a maximum level of the retrieved signal corresponding to the 11T signal is taken as $I_{top}$ (=$I_{11, LAND}$), $I_{11}/I_{top}$ becomes a modulation amplitude $m_{11}$ of a 11T signal.

The modulation amplitude $m_{11}$ of a 11T signal in the ROM area 104 is $I_{11ROM}/I_{topROM}$, while the modulation amplitude $m_{11}$ of a 11T signal in the RAM area 105 is $I_{11RAM}/I_{topRAM}$.

In each of the ROM area 104 and the RAM area 105, preferably, the modulation amplitude $m_{11}$ of a 11T signal is set to be 0.55 or more. This is because an excessively small modulation amplitude $m_{11}$ of a 11T signal makes it difficult to read out a pattern precisely. In addition, it is not preferable that the modulation amplitude $m_{11}$ of a 11T signal in the ROM area 104 is set at a value exceeding 0.95. This is because an excessively large modulation amplitude $m_{11}$ of a 11T signal causes saturation of signal strength when the drive enlarges a signal, which makes it difficult to read out a pattern precisely.

On the other hand, it is not preferable that the modulation amplitude $m_{11}$ of a 11T signal in the RAM area 105 is set at a value exceeding 0.90. That is, when the retrieved signal amplitude is increased in the RAM area 105, although the amplitude of a retrieved signal of a long mark such as 11T or 10T becomes larger, there is a tendency that the retrieved signal level of a short mark such as 3T or 4T lowers as a whole and the amplitudes $I_3$ and $I_4$ of the retrieved signals are hard to enlarge. If a long-mark retrieved signal is enlarged in a state where a short-mark retrieved signal is low, a slice level $I_{slice}$ for detecting a signal from a retrieved waveform becomes excessively low so that there is a possibility that no mark is retrieved, thus making it difficult to read out a pattern accurately.

This condition is essential in that the continuity of the retrieved signal characteristic is maintained in each of the ROM area 104 and the RAM area 105.

More preferably, the ratio ($m_3/m_{11}$) ROM of a modulation amplitude of a 3T signal and modulation amplitude of a 11T signal of an EFM signal of the ROM area 104 is equal to or more than 0.45.

In addition, the ratio ($m_3/m_{11}$) RAM of a modulation amplitude of a 3T signal and modulation amplitude of a 11T signal of an EFM signal of the RAM area 105 is equal to or more than 0.45.

As stated above, since the modulation amplitude $m_1$ of a 11T signal is expressed as $m_{11}=I_{11}/I_{top}$, while the modulation amplitude $m_3$ of a 3T signal is expressed as $m_3=I_3/I_{top}$, the ratio ($m_3/m_{11}$) of the modulation amplitude $m_3$ of a 3T signal and the modulation amplitude $m_{11}$ of a 11T signal is equal to the ratio ($I_3/I_{11}$) of the amplitude $I_3$ of retrieved signal corresponding to the 3T signal and the amplitude $I_{11}$ of retrieved signal corresponding to 11T signal, and for this reason, this can be used instead.

In this connection, the ratio ($m_3/m_{11}$) of the modulation amplitude $m_3$ of a 3T signal and the modulation amplitude $m_{11}$ of a 11T signal, or the ratio ($I_3/I_{11}$) of the amplitude $I_3$ of retrieved signal corresponding to the 3T signal and the amplitude $I_{11}$ of retrieved signal corresponding to the 11T signal signifies the ratio of, of a retrieved signal, the signal with the smallest amplitude and the largest signal, and acts as an index representing a resolution of the retrieved signal.

In this case, preferably, the ratio ($m_3/m_{11}$) of the modulation amplitude $m_3$ of a 3T signal and the modulation amplitude $m_{11}$ of a 11T signal, or the ratio ($I_3/I_{11}$) of the amplitude $I_3$ of retrieved signal corresponding to the 3T signal and the amplitude $I_{11}$ of retrieved signal corresponding to the 11T signal is set to be equal to or more than 0.45 (more preferably, 0.50 and over) in both the ROM area 104 and RAM area 105. This is because, if the resolution is too low, difficulty is encountered in accurately reading out a pattern.

Incidentally, an upper limit is not imposed on the ratio ($m_3/m_{11}$) of the modulation amplitude $m_3$ of a 3T signal and the modulation amplitude $m_{11}$ of a 11T signal, or the ratio ($I_3/I_{11}$) of the amplitude $I_3$ of retrieved signal corresponding to the 3T signal and the amplitude $I_{11}$ of retrieved signal corresponding to the 11T signal, and it is better that the ratio becomes larger. However, since $I_3$ does not exceed $I_{11}$, in fact, the ratio is limited to below 1.

More preferably, an asymmetry value defined by the following equation is set as a specified range.

$$Asym = \left[\frac{I_{slice}}{I_{11}} - \frac{1}{2}\right] \times 100\% \quad (4)$$

That is, preferably, in the ROM area 104, the asymmetry value is −20% through 20%, and the asymmetry value after recording of an EFM signal of the RAM area 105 is −15% through 5%.

Moreover, it is preferable that the ratio $R_{topROM}/R_{topRAM}$ of the maximum reflectances in the ROM area 104 and the RAM area 105 is set to be in a range from 0.7 to 1.45. More preferably, the ratio $R_{topROM}/R_{topRAM}$ is 0.85 through 1.20. In this case, preferably, each of the maximum reflectances $R_{topROM}/R_{topRAM}$ in both the ROM area 104 and RAM area 105 is 15% through 25%.

Thus, if the ratio $R_{topROM}/R_{topRAM}$ of the maximum reflectances in the ROM area 104 and the RAM area 105 is in the range between 0.7 and 1.45, even when the drive continuously has access to the ROM area 104 and the RAM area 105, a precise pattern can be read out through brief gain adjustment in the signal processing of a retrieved signal from the ROM area 104 and a retrieved signal from the RAM area 105.

In this case, there is a need to place a gap portion (close track; for example, corresponding to 2×75×2 kilobytes) at the boundary section between the ROM area 104 and the RAM area 105 or form a lead-in area therebetween so that the time to be needed for the retrieving by the drive becomes longer than that time to be taken for the gain adjustment. Accordingly, even in the case of continuous access from the ROM area 104 to the RAM area 105, the gain adjustment surely reaches completion within the traveling time from the ROM area 104 to the RAM area 105, that is, within the time to be taken for when the optical pickup of the driver travels through the gap portion or the lead-in area.

The maximum reflectance $R_{top}$ represents a reflectance when a retrieved signal corresponding to the 11T signal of an EFM signal assumes the maximum level, and is expressed by the following equation.

$$R_{top}=R_0 \times I_{top}/I_0 \qquad (5)$$

where $R_0$ designates a reflectance at a mirror finished surface portion on the disk, $I_0$ depicts a level of a retrieved signal at the mirror finished surface portion, and $I_{top}$ denotes the maximum level of a retrieved signal corresponding to the 11T signal of the EFM signal.

Incidentally, since the objective lens numerical aperture NA is changed from 0.45 to 0.50 as mentioned above, even in the case of the same laser light, the laser light is further focused so that the diameter of the laser beam with which the disk 100 is irradiated tends to decrease, the modulation amplitude of a 11T signal tends to somewhat increase. Concretely, it is shifted by approximately 0.05 in the increasing direction. However, this create no problem. In this case, the maximum reflectances $R_{topROM}$, $R_{topRAM}$ hardly vary. In addition, the radial contrast or the normalized wobble signal value NWS hardly vary.

Meanwhile, among the CD-RW recording methods, there are a method in which the recording is made continuously from the inner circumference to the outer circumference and a packet write method in which the recording is made discretely as well as a floppy disk.

In general, for use as an external storage device for a computer, the packet write method is more preferable. However, since the aforesaid gap portion or lead-in area is not formed in the case of the packet write method, the gain adjustment is difficult when the drive has continuous access to the ROM 104 and the RAM area 105.

In this case, as will be described later, if a groove(s) is made in the ROM area 104 to decrease the reflectance of the ROM area 104 so that the ratio $R_{topROM}/R_{topRAM}$ of the maximum reflectance $R_{topROM}$ of the ROM area 104 and the maximum reflectance $R_{topRAM}$ of the RAM area 105 is framed in a more preferable range (0.9 and over but 1.10 and below), without conducting the above-mentioned gain adjustment, it is possible to accurately read out a pattern even when the drive has continuous access to the ROM area 104 and the RAM area 105.

Since this does not require the aforesaid gap portion or lead-in area for the gain adjustment, if the ROM area 104 and the RAM area 105 are formed on one CD-RW and used as an external storage device for a computer, the packet write method becomes employable.

Figure 5:
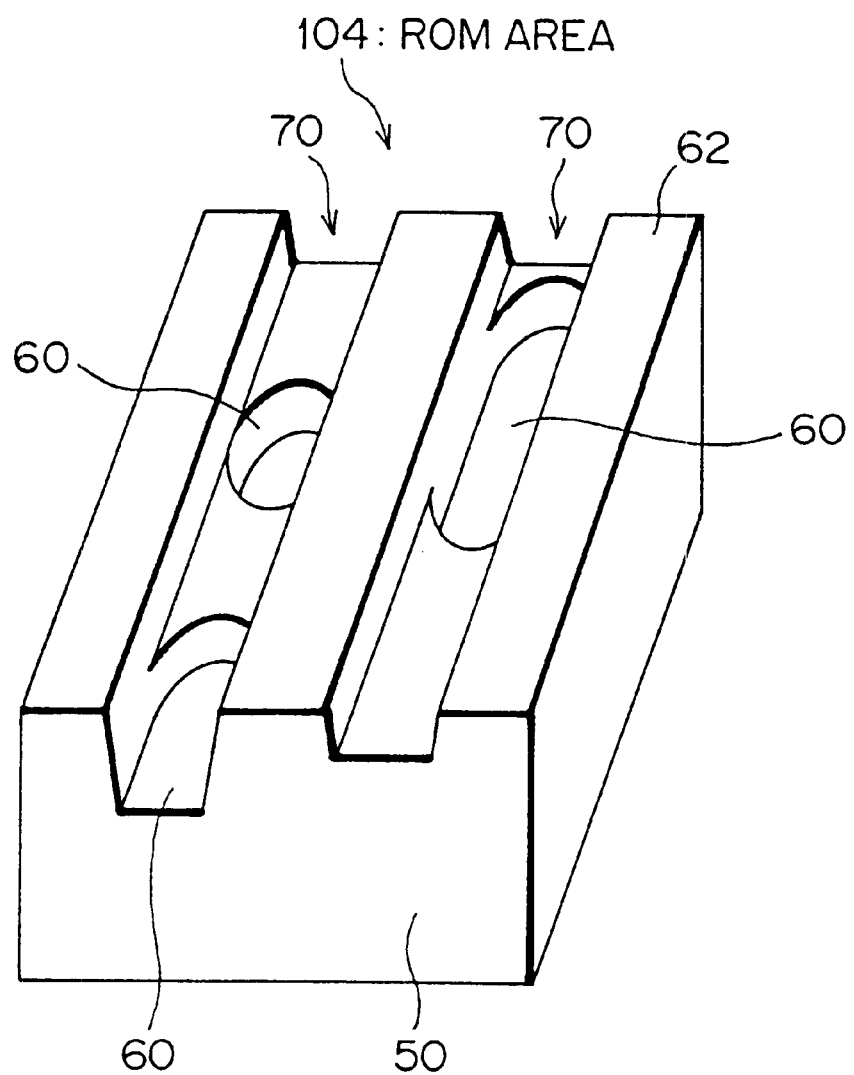
FIG. 5 is an illustrative perspective view for explaining a case in which a groove is made in a ROM area to connect pits, in the rewritable compact disk according to the embodiment of the present invention.
Figure 6A:
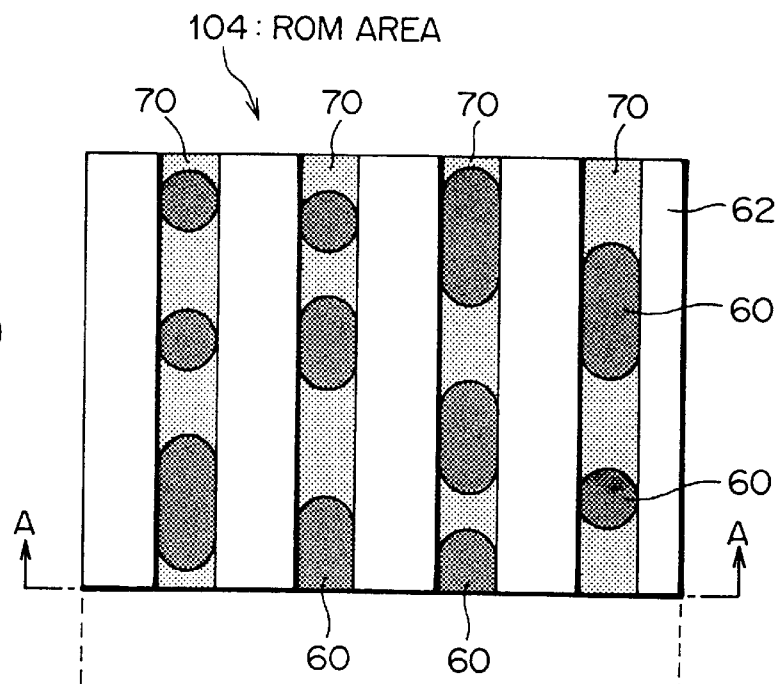
FIG. 6($a$) is an illustrative plan view for explaining a case in which a groove is made in a ROM area to connect pits, in the rewritable compact disk according to the embodiment of the present invention.
Figure 6B:
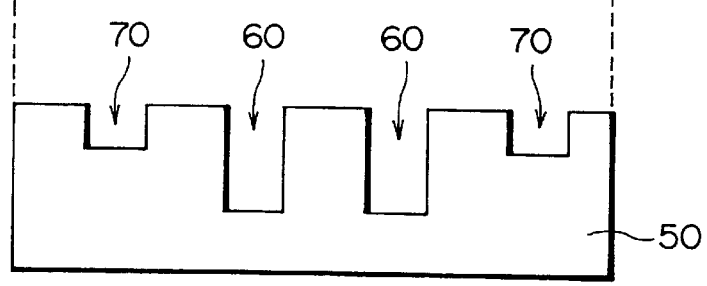

As stated above, in the case of the groove is made in the ROM area 104 to decrease the reflectance of the ROM area 104 so that the ratio $R_{topROM}/R_{topRAM}$ of the maximum reflectance $R_{topROM}$ of the ROM area 104 and the maximum reflectance $R_{topRAM}$ of the RAM area 105 is framed in a more preferable range (0.9 through 1.10), for example, as shown in FIGS. 5 and 6(*a*), (*b*), a portion between pre-pits 60, 60 of a pre-pit string in the ROM area 104 is not formed in a flat condition, but the pre-pits are made to be connected to each other through a groove (for example, a shallow groove) 70. That is, as shown in FIGS. 5 and 6(*a*), (*b*), a groove 70 is made to be in an overlapped condition with each pit string 60 of the ROM area 104.

Preferably, when the ROM area 104 is constructed such that a pit string 60 is recorded in a wide groove 70 to form a groove geometry similar to that of the RAM area 105, it is possible to easily make the signal values (particularly, the maximum reflectances $R_{top}$) of the RAM area 105 and the ROM area 104 agree with each other. In this case, it is preferable that the groove 70 is made to have a groove depth of 30 to 50 nm and a groove width 0.40 to 060 μm in order to provide a groove geometry similar to a guide groove to be made in the RAM area 105 which will be described later. Particularly, the groove 70 is made to be shallower in depth than the pre-pit 60 (in this case, 60 to 100 nm in depth). Incidentally, the groove 70 can be made to have a width wider or narrower than that of the pre-pit 60.

Figure 7:
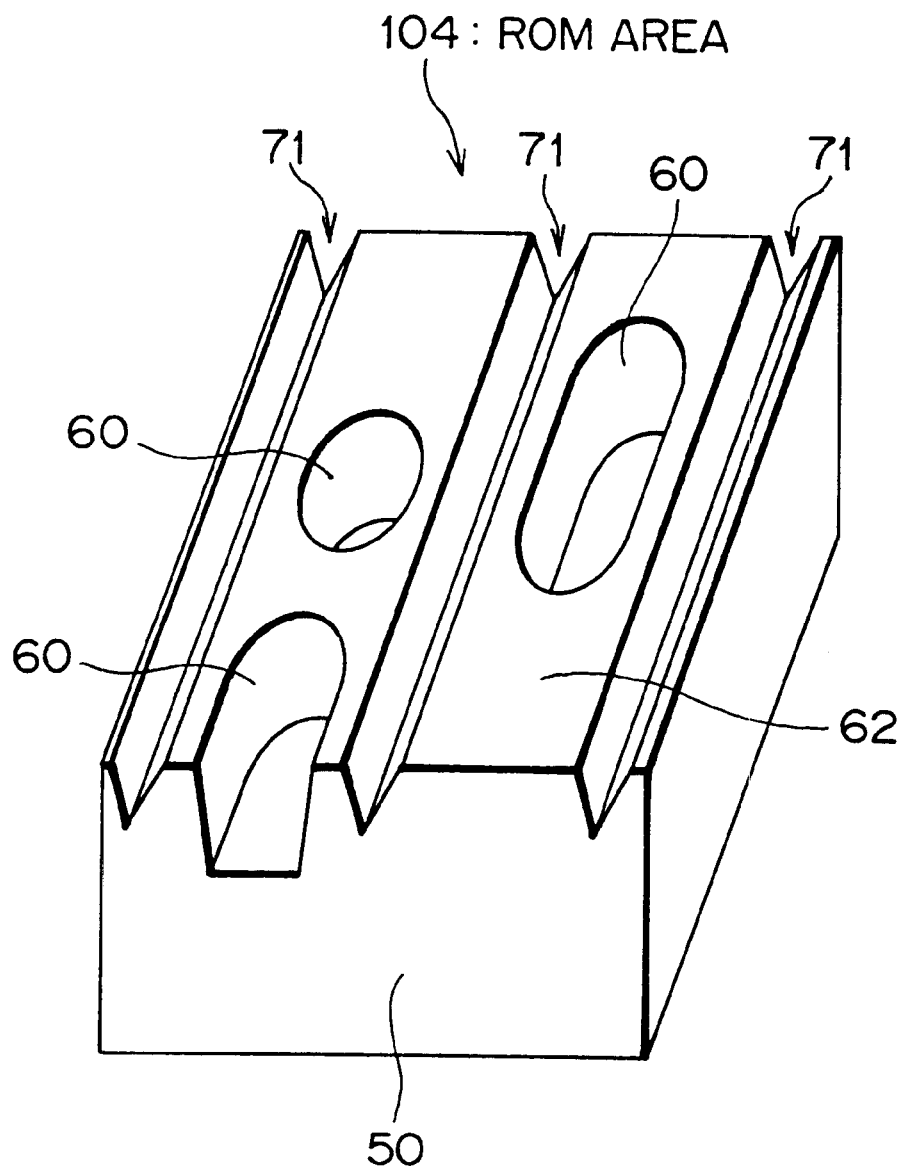
FIG. 7 is an illustrative perspective view for explaining a case in which a groove is made between pit strings in a ROM area, in the rewritable compact disk according to the embodiment of the present invention.
Figure 8A:
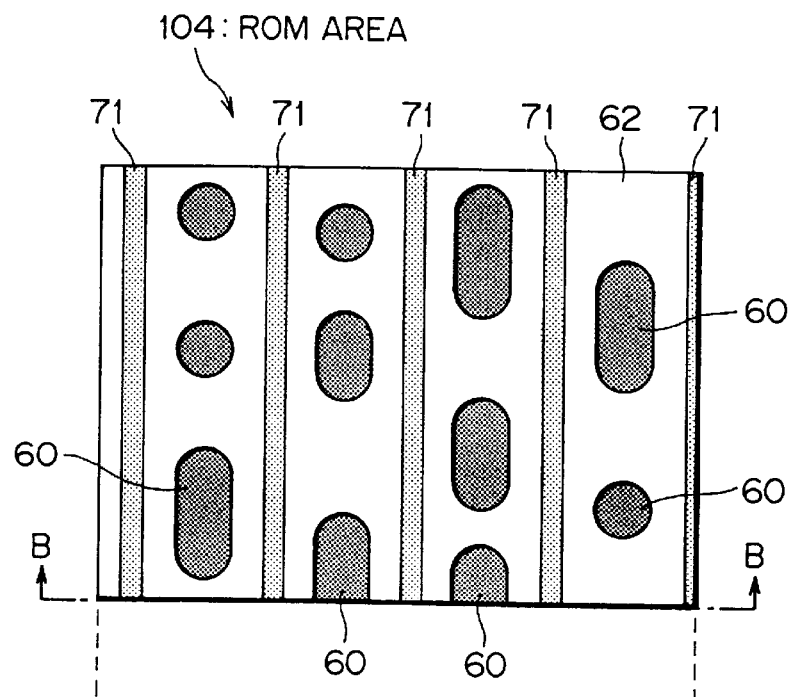
FIG. 8($a$) is an illustrative view for explaining a case in which a groove is made between pit strings in a ROM area, in the rewritable compact disk according to the embodiment of the present invention.
Figure 8B:
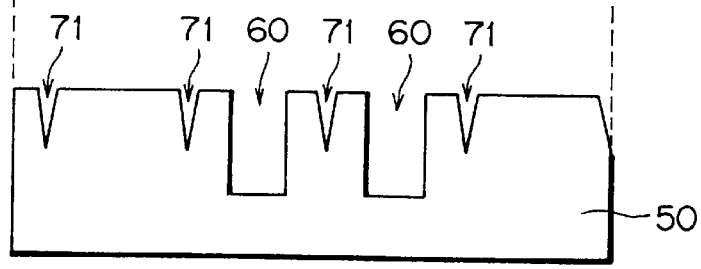

In addition, as shown in FIGS. 7 and 8(*a*), (*b*), it is also appropriate that a groove(s) 71 is made between pre-pit strings 60. That is, as shown in FIGS. 7 and 8(*a*), (*b*), the groove 71 is made between the pre-pit strings 60 along the pre-pit strings 60. Incidentally, in FIGS. 7 and 8(*a*), (*b*), although the groove 71 has a triangular configuration in cross section, it is also acceptable that, for example, it has a rectangular configuration in cross section. In addition, although the depth of the groove 71 is made to be shallower than the depth (in this case, 60 to 100 nm) of the pre-pit 60, it is also possible that the groove 71 is made to be deeper than the pre-pit 60. Still additionally, although the width of the groove 71 is made to be narrower than the width of the pre-pit 60, it is also possible that the groove 71 is made to be wider in width than the pre-pit 60.

If the groove 70, 71 is additionally made in the ROM area 104 in this way, then it is possible to more easily make the signal value (particularly, the maximum reflectance $R_{topRAM}$) of the RAM area 105 having a guide groove 61 and the signal value (particularly, the maximum reflectance $R_{topROM}$) of the ROM area 104 agree with each other, which can more easily provide the interchangeability between the signal value (particularly, the maximum reflectance $R_{topROM}$) of the ROM area 104 and the signal value (particularly, the maximum reflectance $R_{topRAM}$) of the RAM area 105.

In this case, particularly, if there is a large difference in maximum reflectance $R_{top}$ between the ROM area 104 and the RAM area 105, in the case of rapid shifting from the ROM area 104 to the RAM area 105 or from the RAM area 105 to the ROM area 104, the slice level shifts to make the precise retrieving difficult. For this reason, the groove 70, 71 is also made in the ROM area 104 to decrease the maximum reflectance $R_{topROM}$ of the ROM area 104 so that the difference between the reflectances of the ROM area 104 and the RAM area 105 reduces, which enables making the maximum reflectance $R_{topRAM}$ of the ROM area 104 and the maximum reflectance $R_{topROM}$ of the RAM area 105.

In this connection, although it is also considered that the maximum reflectance $R_{topRAM}$ of the RAM area 105 is increased in order to reduce the difference in reflectance between the ROM area 104 and the RAM area 105, increasing the maximum reflectance $R_{topRAM}$ of the RAM area 105 requires a change of a groove geometry in the RAM area 105, and in this case, another groove signal becomes out of an appropriate range or a groove geometry becomes unfit for changing a non-recorded state to a recorded state. Therefore, the change of the RAM area 105 is undesirable.

In a case in which the groove 70, 71 is made in the ROM area 104 in this way, it is preferable that the pit width Pw is set to be 0.40 to 0.70 μm and the pit depth Pd is set at 90 to 150 nm.

In the case of the formation of the groove 70, 71 in the ROM area 104, the expectation exists that, for example, the modulation amplitude $m_{11}$ of a 11T signal decreases considerably and the value of a push pull signal increases.

That is, when the groove 70, 71 is formed in the ROM area 104, although the maximum reflectance $R_{topROM}$ of the ROM area 104 drops to a value approximately equal to the maximum reflectance $R_{topRAM}$ of the RAM area 105, for example, as shown in FIGS. 5 and 6(*a*), (*b*), the apparent pit depth Pd of the pre-pit of the ROM area 104 becomes lower because of the presence of the groove 70, with increased $R_{bottom}$. Accordingly, it is considered that the modulation amplitude $m_{11}$ of a 11T signal decreases according to the following equation, thus increasing the value of a push pull signal.

$$m_{11}=(R_{top}-R_{bottom})/R_{top}$$

In order to avoid this and increase the modulation amplitude $m_{11}$ of a 11T signal, the pit depth Pd is required to be made deeper than before. In general, although the value of a push pull signal decreases when the pit depth Pd increases, if the groove is made as mentioned above, then it is considered that the value of a push pull signal increases somewhat, which can compensate for that.

Incidentally, in this case, although a groove(s) is made in the ROM area 104 in order to easily make the signal values (particularly, the maximum reflectances $R_{top}$) of the RAM area 105 and the ROM area 104 agree with each other, the present invention is not limited to this, but it is also appropriate that, for example, before actual use, the ROM area 104 is irradiated with DC (direct current) light (DC light). That is, it is also appropriate that a DC light beam which is set at specified power is continuously applied onto a track at a specified linear velocity.

Usually, in the initialized state, a recording film is entirely in a crystalline with a high reflectance. Between the crystalline with a high reflectance and an amorphous state, a state in which both are mixed exists, and hence, if the power of the DC light or the linear velocity is changed to control the crystalline of the recording film, then it becomes possible to arbitrarily set the intermediate reflectance therebetween to some extent. Accordingly, if the ROM area 104 is irradiated with DC light to provide a relatively lower reflectance than that of the crystalline in the initialized state, then it is possible to make the signal values (particularly, the maximum reflectances $R_{top}$) of the RAM area 105 and the ROM area 104 agree with each other.

Meanwhile, it is preferable that the pre-pit string 60 in the ROM area 104 is made to have a wobble. This enables obtaining a synchronizing signal, an address signal or the like from the wobble of the guide groove 61 in the RAM area 105 and further permits obtaining a synchronizing signal, an address signal or the like from the wobble in the ROM area 104; therefore, the drive is not required to switch the method of detecting the synchronous signal, the address signal or the like between the ROM area 104 and the RAM area 105, which simplifies the circuit of the drive, and provides extreme advantages.

For certainly retrieving the synchronous signal or address signal of the wobble, it is preferable that the value NWS-ROM of normalized wobble signal of this pit string 60 is in a range from 0.035 to 0.060. This is because, if the value NWSROM of normalized wobble signal of this pit string 60 is excessively low, difficulty is encountered in detecting address information or the like accurately, and if it is too high, the pit string deviates from the average center of a track.

Figure 9A:
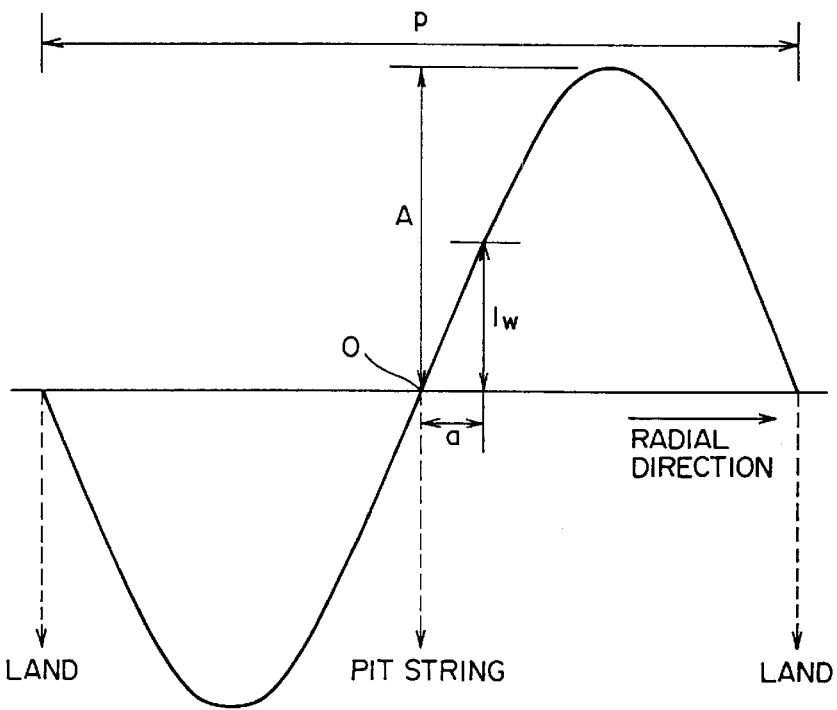
FIG. 9($a$) is an illustration for explaining a pit string having a wobble in the rewritable compact disk according to the embodiment of the present invention, and is an illustration for explaining an $I_2$–$I_2$ signal obtained from this pit string.
Figure 9B:
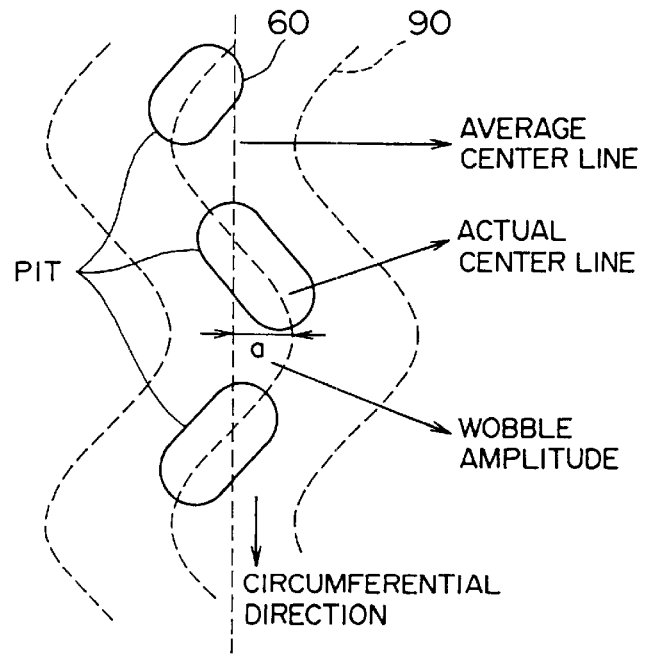

Referring to FIGS. 9(*a*), (*b*), a description will be given of the value $NWS_{ROM}$ of normalized wobble signal.

FIG. 9(*b*) is an illustration of a pit string 60 having a wobble 90 in the ROM area 104, and FIG. 9(*a*) is an illustration of an $I_1-I_2$ signal value to be obtained from the pit string 60 having the wobble 90.

When the amplitude of the wobble 90 is taken as a, the $I_1-I_2$ signal value at that time is $I_w$, which corresponds to the signal value (wobble signal value) to be obtained from the wobble 90. In FIG. 9(*a*), character A represents a peak value of the $|I_1-I_2|$ signal retrieved without tracking and passed through a 5-kHz low-pass filter.

In the actual measurement, a peak value of an $|I_1-I_2|$ signal passed through a band-pass filter of 10 kHz to 30 kHz and measured while undergoing the tracking is taken as a value $I_w$ of a wobble signal of a pit string.

Thus, the value $NWS_{ROM}$ of a normalized wobble signal of the pit string 60 is defined by the following equation (6).

$$NWS_{ROM} = \frac{I_w}{2 \times A \times \sqrt{2}} \qquad (6)$$

Preferably, the CNR value of a wobble signal of the pit string 60 is equal to or more than 26 dB.

In addition, the value of a normalized wobble signal in the RAM area 105 is defined according to the above-mentioned equation (6), and preferably, it is in a range from 0.035 to 0.060, and the CNR value of a wobble signal before recording of an EFM signal is equal to or more than 35 dB while the CNR value of the wobble signal after recording of the EFM signal is equal to or more than 26 dB.

Meanwhile, it is considered that a large difference naturally occurs in configuration between the pre-pit string 60 of the ROM area 104 whose main object is to retrieve information utilizing the diffraction of reflected light and the groove (guide groove) 61 of the RAM area 105 whose main object is to implementing the tracking control for recording/retrieving. Particularly, a difference occurs totally in optimal depth value between the information retrieving purpose and the tracking control purpose.

For this reason, for acquiring an appropriate groove signal characteristic or retrieved signal, it is considered that there are a large difference in cross-sectional profile between the pit geometry of the ROM area 104 and the guide groove geometry of the RAM area 105.

Figure 10:
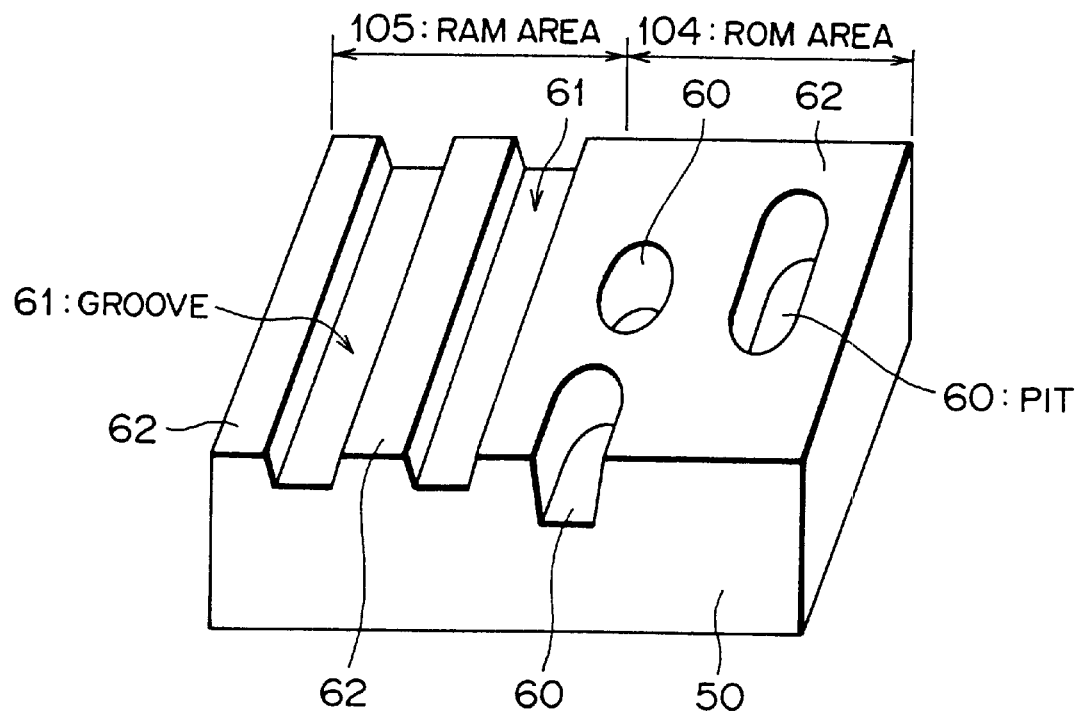
FIG. 10 is an illustrative plan view for explaining a groove and pit made in a substrate of the rewritable compact disk according to the embodiment of the present invention.

In this embodiment, as FIG. 10 shows, the pre-pits 60 are formed in the ROM area 104, while guide grooves 61 are formed in the RAM area 105. In FIG. 10, numeral 62 designates a land, and numeral 63 depicts a recording mark. In addition, a portion denoted at numeral 64, that is, a portion other than the recording mark 63 in the groove 61, is also referred to as a land.

Figure 11A:
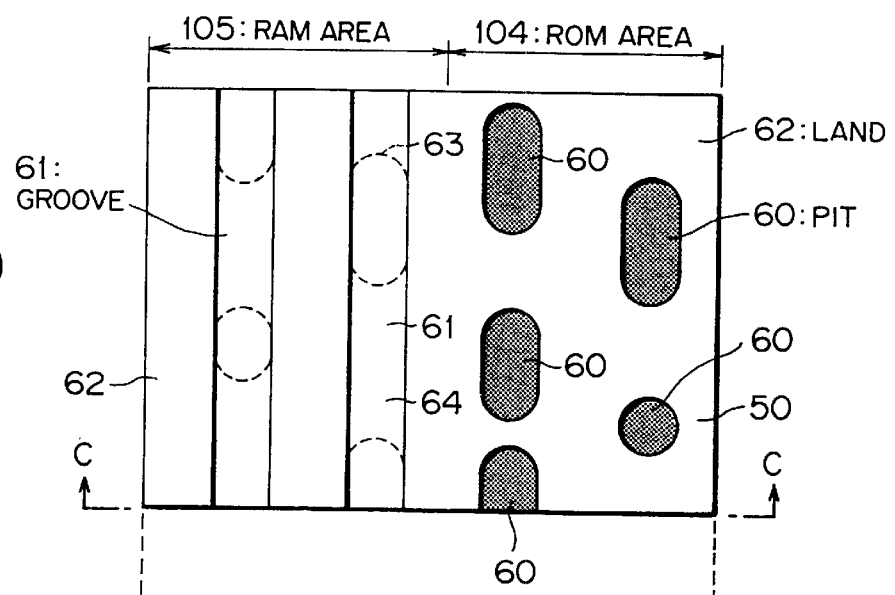
FIG. 11($a$) is an illustrative plan view for explaining a groove and pit made in a substrate of the rewritable compact disk according to the embodiment of the present invention.
Figure 11B:
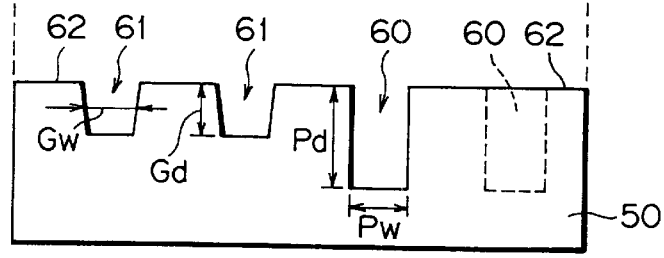

Preferably, each pit 60 constituting a pre-pit string of the ROM area 104 is, as shown in FIGS. 11(*a*), (*b*), set to have a pit depth Pd of 60 to 100 nm and a pit width Pw of 0.45 to 0.70 μm. Particularly, it is more preferable that the pit depth Pd is set to be equal to or more than 70 nm. This allows a sufficient modulation amplitude ml of a 11T signal to be obtained. In addition, it is more preferable that the pit width Pw is equal to or more than 0.50 μm. Accordingly, a sufficient value of a push pull signal is more easily attainable.

In this case, since the modulation amplitude $m_{11}$ of a 11T signal and the value of a push pull signal are in a tradeoff relation, the pit depth Pd or the pit width Pw are set so that both the modulation amplitude $m_{11}$ of a 11T signal and value of a push pull signal assume a desired value.

Moreover, in view of a value of a push pull signal to be obtained from the RAM area 105, a reflectance or the like, it is preferable that the groove 61 of the RAM area 105 is made such that its groove depth Gd is set at 30 to 50 nm and its groove width Gw is set at 0.40 to 0.60 μm. When the groove depth Gd or the groove width Gw is set like this, the tracking can be conducted accurately so that a desired value is obtainable as a value of a push pull signal, and the groove geometry is preventable from being damaged at the repeated rewriting.

At this time, a rewritable compact disk capable of sufficiently satisfying the aforesaid groove signal characteristic and retrieved signal characteristic is attainable.

The geometry of the groove 61 to be defined here is based on a value measured through the optical groove geometry measurement. A detailed description will be given hereinbelow of the definition and the measuring method.

In this case, since it is preferable that the guide groove 61 of the RAM area 105 has a generally rectangular configuration, let it be assumed that the groove geometry is a rectangular groove. A description will be given hereinbelow of a method of measuring the intensity of diffracted light at this time for calculating a groove width w and a groove depth d on the basis of the measured value.

Figure 12:
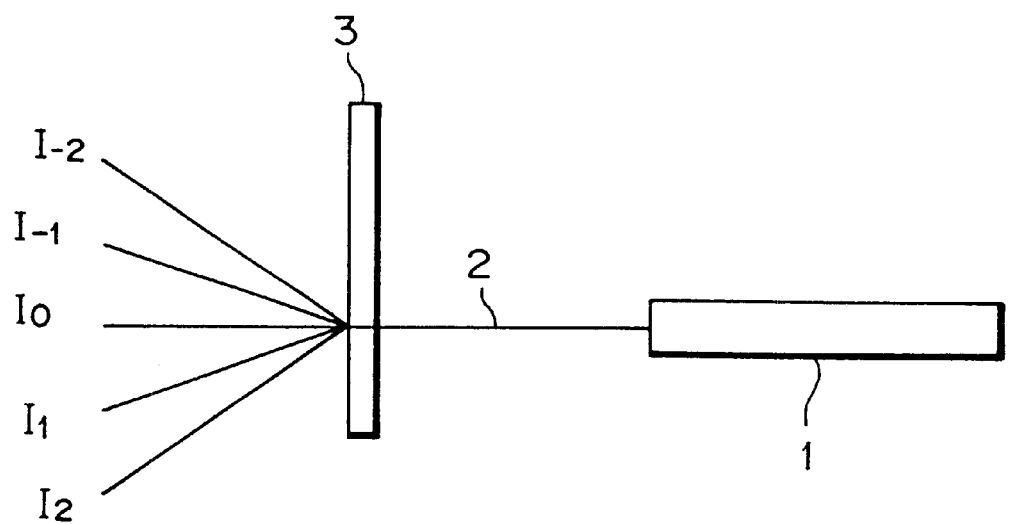
FIG. 12 is an illustrative view for describing an optical groove geometry measuring method of optically measuring a groove geometry in the rewritable compact disk according to the embodiment of the present invention, using diffraction light.

As FIG. 12 shows, a polycarbonate substrate 3 whose one surface has a formed groove is disposed perpendicularly with respect to a laser beam 2 from an He—Cd laser 1, and the laser beam 2 is applied to the surface with no groove. The intensities of the respective diffracted light, that is, the intensity $I_0$ of zero-order light, the intensities $I_1$, $I_{-1}$ of first-order light and the intensities $I_2$, $I_{-2}$ of second-order light, are measured by an optical detector.

At this time, the relationship expressed by the following equations (7) and (8) is satisfied. The width w and the depth d are obtained by solving the equation (7) and the equation (8) simultaneously.

Although the actual geometry of the groove 61 does not necessarily have a right rectangular configuration, this embodiment employs the values of the width w and the depth d determined univocally through the aforesaid measuring method.

$$\frac{I_2}{I_1} = \cos(\pi\varepsilon) \quad (7)$$

$$\frac{I_1}{I_0} = \frac{2\sin^2(\pi\varepsilon)(1-2\cos\delta)}{\pi^2\{1-2\varepsilon(1-\varepsilon)(1-\cos\delta)\}} \quad (8)$$

In addition, the width and depth of the pit 60 were measured by an atomic force microscope (AFM) through the use of a probe, whose tip portion has a radius of curvature of 10 nm.

A description will be given hereinbelow of a preferred example of a method of forming the groove 61 and pit 60 which have configurations mentioned above.

Usually, the following processes are conducted in manufacturing an optical disk. That is, a photosensitive resin is applied onto a polished clean and flat glass plate to form a photosensitive layer, and in a state where the glass plate is rotated and an original form or an optical system is moved so that a microscopic laser beam focused through an objective lens travels in a radial direction of the original form, the photosensitive layer is irradiated to make exposure of a desired pattern. This is developed using an alkali developer to remove the sensitized portion, thereby forming a master having a pre-format of an embossed pattern.

According to the above-mentioned manufacturing method, as the profiles of the cross-sectional configurations of the pit 60 or the guide groove 61, there are two configurations when roughly classified: a rectangular configuration formed by making the exposure with large power so that an exposed portion reaches the glass original form, and a triangular or Gaussian configuration groove formed by making the exposure with power so that the exposed portion ends in the middle of the photoresist film.

If the cross-sectional profile of a laser beam with which the photoresist film is irradiated forms the Gaussian configuration and the optical system and the photoresist film to be used are fixed, when the groove depth is determined, the groove width is also determined univocally. That is, the relationship is set up so that as the groove becomes shallower in depth, the groove becomes narrower in width, and as the groove becomes deeper in depth, the groove becomes wider in width.

However, the guide groove 61, being formed in the RAM area 105 of the optical disk 100 according to this embodiment, is a guide groove having a generally rectangular configuration, and in the groove geometry thereof, it is preferable that the groove depth Gd is as shallow as 30 to 50 nm and the groove width Gw is as wide as 0.40 to 0.60 μm. According to an ordinary manufacturing method, difficulty is experienced in making the guide groove 61 having the above-mentioned groove geometry.

For example, if the laser wavelength is prolonged, or if an objective lens having a small numerical aperture is put to use, although the guide groove 61 with the foregoing groove geometry is producible, it is not easy to form an exposed portion with satisfactory contrast.

Therefore, it is preferable to employ the following manufacturing method for manufacturing a rewritable compact disk in which a guide groove is made to have the foregoing groove geometry.

Figure 14:
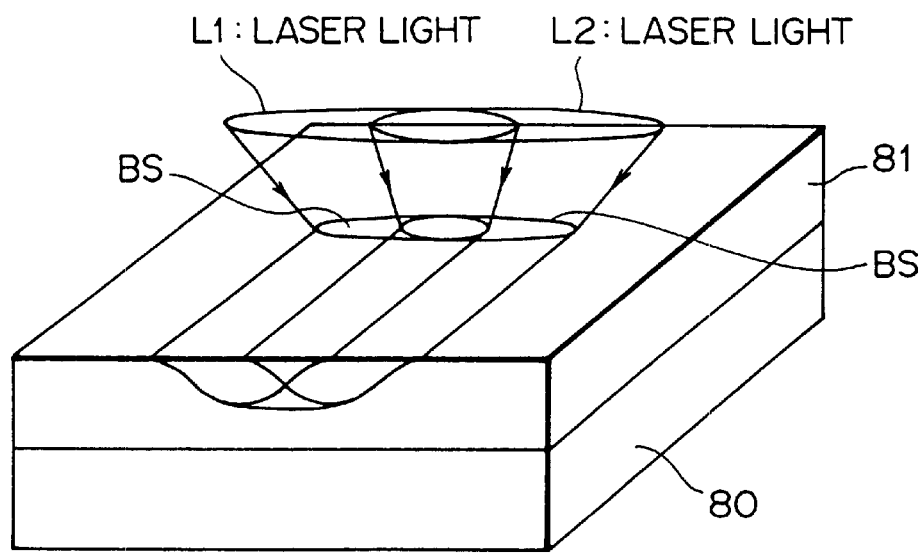
FIG. 14 is an illustrative perspective view for explaining an exposure method of a manufacturing method of the rewritable compact disk according to the embodiment of the present invention.

That is, in a manufacturing method in which irradiation for exposure is carried out with laser light L according to a pre-pit string and groove to be made in a photoresist film 81 formed on a glass base board 80, and a master with the pre-pit string and the groove is produced through development for producing a stamper on the basis of the master so that a substrate 50 having a pre-pit string 60 and a groove 61 is produced on the basis of the stamper, and a phase-change recording layer 52 is then formed thereon, when the photoresist film 81 is irradiated with the laser light L according to the groove, as shown in FIG. 14, a plurality of laser lights L1 and L2 are arranged so that the laser lights adjacent to each other partially overlap with each other in a direction perpendicular to a traveling direction of the laser lights L1 and L2, and the irradiation is carried out for exposure (exposure method 1).

Figure 15:
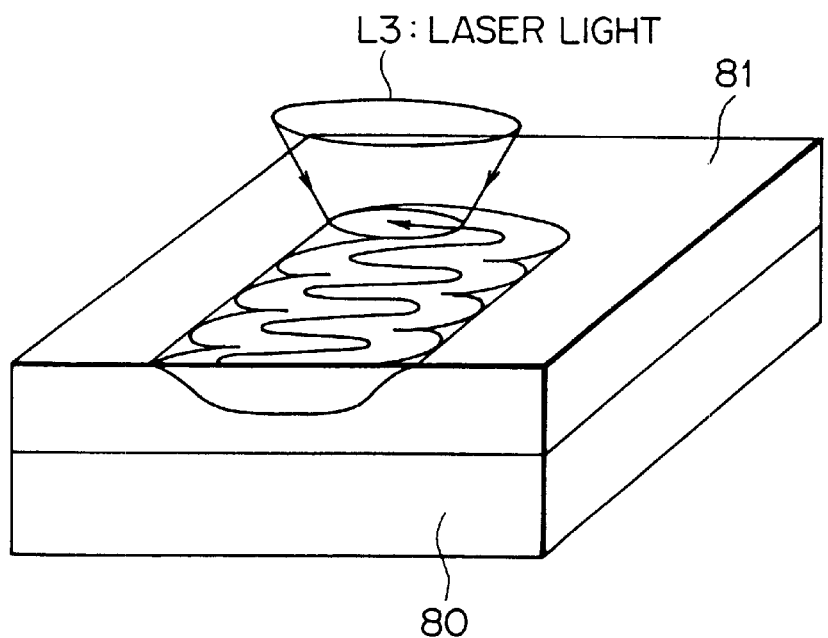
FIG. 15 is an illustrative perspective view for explaining another exposure method of a manufacturing method of the rewritable compact disk according to the embodiment of the present invention.

Alternatively, in a manufacturing method in which irradiation for exposure is carried out with laser light according to a pre-pit string and groove to be made in a photoresist film 81 formed on a glass base board 80, and a master with the pre-pit string and the groove is produced through development for producing a stamper on the basis of the master so that a substrate 50 having a pre-pit string 60 and a groove 61 is produced on the basis of the stamper, and a phase-change recording layer 52 is then formed thereon, when the photoresist film 81 is irradiated with the laser light L according to the groove 61, as shown in FIG. 15, the irradiation for the exposure is carried out while oscillations are made $2.5 \times 10^6$ times/m or more but $25 \times 10^6$ times/m or less in directions perpendicular to a traveling direction of the laser light L3 (exposure method 2).

A detailed description will be given hereinbelow of the exposure methods 1 and 2.

(Exposure Method 1)

Figure 13:
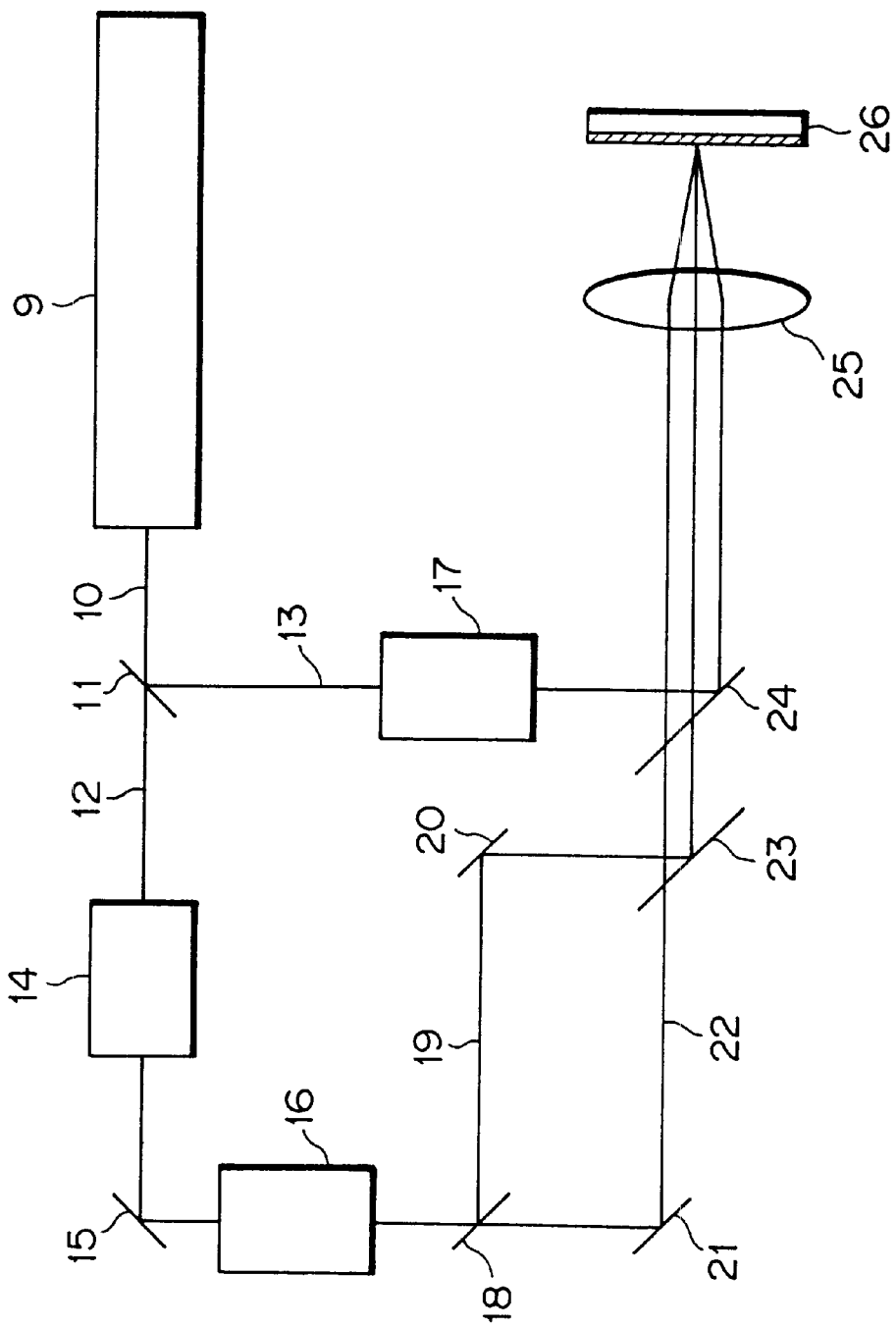
FIG. 13 is a schematic illustration of a structure of an example of a laser optical system for use in the embodiment of the present invention.

FIG. 13 is an illustration of an exposure system for use in this exposure method.

In FIG. 13, numeral 9 represents a laser generating device, numerals 11, 18, 23 and 24 represent beam splitters, numerals 15, 20 and 21 depict reflecting mirrors, numerals 14 and 17 depict optical modulators, numeral 18 denotes a deflector, numeral 25 denotes an objective lens, and numeral 26 designates a glass substrate on which a photoresist film is application-formed. As the laser light, Ar light having a wavelength of 488 nm; Kr light having a wavelength of 413 nm, or the like are put to use.

A laser beam 10 emitted from the laser generating device is divided into two laser beams 12 and 13 by means of the beam splitter 11. The laser beams 12 and 13 are intensity-modulated by the optical modulators 14 and 17, respectively, and the laser beam 12 is then angle-deflected by the deflector 16 to provide a wobble so that a guide groove represents address information FM-modulated at a central frequency of 22.05 KHz.

The laser beam 12 is divided into laser beams 19 and 22 by the beam splitter 18. Thereafter, the three laser beams 13, 19 and 22 are handled by the reflecting mirror 20 and the beam splitters 23 and 24 to be arranged in a straight line on a glass substrate in a radial direction of the substrate, and the laser beams 19 and 22 are disposed so that the parts thereof overlap with each other, and further the laser beam 13 is disposed to be positioned at the middle between the laser beams 19 and 22 to be incident on the objective lens 25.

The glass substrate 26 on which a photoresist film having a thickness of 900 Å is application-formed is rotated at a linear velocity of 1.2 m/s and is irradiated with the laser beams 13, 19 and 22 from the objective lens 25, thereby exposing this photoresist film. This is developed with an alkali developer to form a pit 60 or a groove 61.

In exposing an ordinary pit string, if the irradiation is carried out with the laser beam 13 having laser power which causes an exposed portion reaches the glass substrate, the photoresist film is exposed to form a rectangular exposed portion.

On the other hand, at the exposure of the RAM area 105, when the beams 19 and 22 are used for the irradiation, the photoresist film is exposed to form an exposed portion. At this time, although the quantity of laser light incident on the objective lens is not so large as the exposure of the photoresist film reaches the glass substrate, as shown in FIG. 14, the adjustment of the positions and intensity ratio of two beam spots BS is made while the plurality of laser lights L1 and L2 are arranged so that the adjacent laser beams partially overlap with each other in a direction perpendicular to the traveling direction of the laser lights L1 and L2, thus providing a groove geometry having a configuration more similar to a rectangular configuration, as compared with a case in which exposure is carried out with a single beam.

In exposing a pit string 60 having a wobble 90, a deflector, not shown, is additionally provided after the optical modulator 17 to cause the laser beam 13 to be angle-deflected to provide a wobble 90 so that a pit string 60 to be formed represents address information FM-modulated at a center frequency of 22.05 KHz.

In a case in which pit strings 60 having a wobble 90 are connected through a shallow groove, it is also appropriate that the beams 19 and 22 are angle-deflected to the wobble 90 and used for irradiation to form a groove, and at the same time, the beam 13 is intensity-modulated in accordance with a pit signal and used for irradiation to form a pit portion.

Alternatively, it is also appropriate that the beams 19 and 22 are intensity-modulated in accordance with a pit signal while being angle-deflected to the wobble 90, and used for irradiation to expose only the pit 60 portion deeply.

(Exposure Method 2)

Referring to FIG. 13 used for explaining the aforesaid exposure method 1, a description will be given of this exposure method 2.

First, a laser beam 10 emitted from the laser generating device 9 is divided into two laser beams 12 and 13 by means of the beam splitter 11. As the laser light, Ar light having a wavelength of 488 nm, Kr light having a wavelength of 413 nm, or the like are put to use. The laser beams 12 and 13 are intensity-modulated by the optical modulators 14 and 17, respectively, and only the laser beam 12 is then 10 m rad-angle-deflected at a radio frequency (high frequency) of 5 MHz by the deflector 16, and at the same time, is angle-deflected to provide a wobble so that a guide groove to be formed in this way represents address information FM-modulated at a central frequency of 22.05 KHz.

The laser beam 12 is divided into laser beams 19 and 22 by the beam splitter 18, and of these, the laser beam 19 is intercepted by an intercepting plate, not shown, and only the laser beam 22 passes through the beam splitter 23.

Thereafter, the laser beam 13 and the laser beam 22 are disposed to overlap at the same position on the glass substrate by the beam splitter 24, and incident on the objective lens 25.

The glass substrate 26 on which a photoresist film having a thickness of 900 Å is application-formed is rotated at a linear velocity of 1.2 m/s and is irradiated with the laser beams 13 and 22 from the objective lens, thus exposing this photoresist film. This is developed with an alkali developer to form a pit 60 or a groove 61.

In exposing an ordinary pit string, if the irradiation is carried out with the laser beam 13 having laser power which causes an exposed portion reaches the glass substrate, the photoresist film is exposed to form a rectangular exposed portion.

On the other hand, at the exposure of the RAM area 105, when the laser beam 22 angle-deflected is used for the irradiation, the photoresist film is exposed to form an exposed portion. At this time, although the quantity of laser light incident on the objective lens is not so large as the exposure of the photoresist film reaches the glass substrate, and the exposure reaches only the middle of the photoresist film, since the laser beam is angle-deflected at as a radio frequency as 5 MHz, as compared with the exposure made with a beam which does not undergo the angle-deflection, it is possible to provide a groove geometry having a configuration more similar to a rectangular configuration.

As FIG. 15 shows, it is preferable that the photoresist film 81 is irradiated for exposure while oscillations are made $2.5 \times 10^6$ times/m or more but $25 \times 10^6$ times/m or less in directions perpendicular to a traveling direction of the laser light L3. For example, when the substrate is rotated at a linear velocity of 1.2 m/s, the angle deflection is made at a high frequency of 3 to 30 MHz. If the linear velocity is set at 2.4 m/s, the angle deflection is made at a high frequency of 6 to 60 MHz.

In exposing a pit string 60 having a wobble 90, a deflector, not shown, is additionally provided after the optical modulator 17 to cause the laser beam 13 to be angle-deflected to provide a wobble 90 so that a pit string 60 to be formed represents address information FM-modulated at a center frequency of 22.05 KHz.

In a case in which pit strings 60 having a wobble 90 are connected through a shallow groove, it is also appropriate that the beams 19 and 22 are angle-deflected to the wobble 90 and used for irradiation to form a groove, and at the same time, the beam 13 is intensity-modulated in accordance with a pit signal and used for irradiation to form a pit 60.

Alternatively, it is also appropriate that the beams 19 and 22 are intensity-modulated in accordance with a pit signal while being angle-deflected to the wobble 90, and used for irradiation to expose only the pit 60 portion deeply.

The exposed glass substrates obtained through the aforesaid exposure method 1 and the aforesaid exposure method 2 are developed using an alkali developer to remove the exposed portion for producing a master having a pre-format of an embossed pattern. A nickel thin film is formed on a surface of that master by means of the sputtering or the like and, for example, wet plating is further conducted in an electrolyte containing nickel ion to form a stamper on the surface of the master for an optical disk, and the nickel stamper is peeled off from the master, thereby obtaining a stamper on which the pre-format information of the master is transferred reversely.

On the basis of this stamper, the substrate 50 having the pre-pit string 60 and the groove 61 is formed, and a layer including the phase-change recording layer 52 is provided thereon, thus providing the rewritable compact disk 100 according to the present invention.

Secondly, a description will be given of a physical structure of the rewritable compact disk according to the present invention. As FIG. 2 shows, at least the phase-change recording layer 52 exists on the substrate 50, and preferably, protective layers 51 and 53 are placed above and under the recording layer 52, and a reflective layer 54 is provided thereon.

As the disk substrate 50, there is used a substrate, such as a resin including polycarbonate, acrylic, polyolefin or the like, or a glass, transparent to recording/retrieving light.

When the protective layers 51 and 53 are provided above and under the recording layer 52, it is preferable that the protective layer thickness is approximately 10 nm to 500 nm.

The material for the protective layers 51 and 53 is determined in consideration of refractive index, heat conductivity, chemical stability, mechanical strength, adhesion and other, while it is possible to employ oxide, sulfide or nitride of a metal or semiconductor having a high transparency and a high melting point, or fluoride of Ca, Mg, Li or the like. These oxide, sulfide, nitride and fluoride are not always required to have stoichiometrical composition, and it is also useful to control the composition for controlling the refractive index or the like, or to employ a mixture thereof. Particularly, taking the repeated recording characteristic into consideration, a mixture of dielectric is preferable. For this reason, each of the protective layers 51 and 53 are equally referred to as a dielectric layer.

More concretely, there are ZnS, $TaS_2$, and mixtures of rare earth sulfide and heat resistance compound such as oxide, nitride, carbide and fluoride. For example, it is preferable to employ a mixture, such as ZnS and $SiO_2$, ZnS and rare earth oxide, ZnS and ZnO, ZnS—$SiO_2$—$TaO_x$, ZnS—ZnO—$SiO_2$, or the like.

Taking the repeated recording characteristic into consideration, in view of mechanical strength, it is preferable that the film density of these protective layers exceeds 80% of that in a bulk condition. In the case of a mixture dielectric thin film being employed, the theoretical density expressed by the following equation is used as a bulk density.

$$\rho = \Sigma m i \rho i \qquad (9)$$

mi: mol concentration of each component i
ρi: single bulk density

If the thickness of the protective layers (dielectric layers) 51 and 53 is less than 10 nm, the deformation preventing effect on the substrate 50 and the recording layer 52 becomes insufficient, there is a probability that they cannot act as the protective layers. On the other hand, if the thickness of the protective layers (dielectric layers) 51 and 53 exceeds 500 nm, the internal stress of the dielectric substance or the difference in elastic characteristic with respect to the substrate appears remarkably, which easily develops cracks.

Particularly, the protective layer (lower protective layer) 51 to be interposed between the substrate 50 and the recording layer 52 is required to suppress the substrate deformation stemming from heat, and hence, the thickness thereof is preferable to be equal to or more than 50 nm. If less than 50 nm, the microscopic substrate deformation accumulates during the repeated overwriting operation so that the retrieved light scatters to increase the noise significantly. For the lower protective layer 51, the substantial upper limit is approximately 200 nm in view of the deposite time, and the thickness exceeding the 200 nm causes the groove geometry on the recording layer 52 to differ largely from the groove geometry on the substrate 50; therefore, it is not desirable. That is, the groove becomes shallower in depth on the substrate surface than intended, and the groove becomes narrower in width on the substrate surface than intended, so it is undesirable. More preferably, it is 150 nm and below.

On the other hand, the protective layer (upper protective layer) 53 to be interposed between the recording layer 52 and the reflective layer 54 is required to be at least 10 nm and over in thickness in order to suppress the deformation of the recording layer 54. In addition, if the thickness is more than 50 nm, the microscopic plastic deformation accumulates in the interior of the upper protective layer 53 in the repeated overwriting operation so that the retrieved light scatters to undesirably increase the noise. According to experiments, when the film thickness of the upper protective layer 53 is in a range of 10 to 50 nm, as it becomes thinner, the deterioration in the repeated overwriting operation reduces.

For the recording at a relatively low linear velocity, attaching importance to the repeated overwrite durability, it is preferable that the film thickness of the upper protective layer 53 is less than 30 nm.

Moreover, for the recording at a high linear velocity, since it is necessary to carry out the recording through laser irradiation for a short time, it is effective to relatively increase the film thickness of the protective layer because a high recording sensitivity is preferable. For example, when the recording is carried out at a linear velocity of 9 m/s or more, the film thickness of the upper protective layer is preferable to be approximately 25 to 50 nm.

Still moreover, even if the recording linear velocity is low, for enlarging the available linear velocity range, it is effective to increase the film thickness of the reflective layer 54. However, in this case, because the recording sensitivity lowers, increasing the thickness of the upper protective layer 53 sometimes becomes an available means, as with the case of the high linear velocity. At this time, preferably, the film thickness of the upper protective layer 53 is approximately 25 to 50 nm.

As the material for the phase-change recording layer 52, various materials well known so far are employable, such as GeSbTe, InSbTe, AgSbTe, AgInSbTe, AgGeSbTe or InGeSbTe, and the most preferable material is an alloy whose main component is an SbTe alloy in the vicinity of an $Sb_{70}Te_{30}$ eutectic point, which is stable in both the crystalline and amorphous states and which permits fast phase transition between both the states, for that it is the most practical material because the segregation is hard to develop in the repeated overwrite condition.

The particularly preferable composition of the phase-change recording layer 52 contains an $Ma_w(Sb_zTe_{1-z})_{1-w}$ alloy (where $0 \leq w \leq 0.3$, $0.5 \leq z \leq 0.9$, Ma represents at least one kind selected from In, Ga, Zn, Ge, Sn, Si, Cu, Au, Ag, Pd, Pt, Pb, Cr, Co, O, N, S, Se, Ta, Nb, V, Bi, Zr, Ti, Mn, Mo, Rh and rare earth elements. More preferably, $0 \leq w \leq 0.2$, $0.6 \leq z \leq 0.8$.

According to the study by the inventors and other people, the linear velocity dependency is determined by Sb and Te constituting the main component, and in the vicinity of an $Sb_{70}Te_{30}$ eutectic point, there is a tendency that, as the ratio Sb/Te increases, the crystallization speed becomes higher.

For the repeated overwrite in a specified pulse pattern, a ternary system material doped with Ge or In in the vicinity of this eutectic composition shows a less deterioration than a material in the vicinity of GeTe—$Sb_2Te_3$, InTe—$Sb_2Te_3$ pseudo-binary alloy which has been widely known, and is a satisfactory material for that the jitter at the mark edge in long-mark recording is low. In addition, it has a high crystallization temperature and excellent archival stability.

Incidentally, since the recording layer 52 immediately after the deposite is commonly in an amorphous state, the entire surface of the recording layer is crystallized into an initialized state (non-recorded state) as will be described later.

With this composition, excellent overwrite becomes feasible in a wide linear velocity range from at least 1-time velocity (1.2 to 1.4 m/s) of the CD linear velocity to 24-times velocity (28.8 m/s to 33.6 m/s) thereof.

As a more preferable example, there is a composition of $Mb\alpha_1In\beta_1Sb\gamma_1Te\eta_1$ (where $0.03 \leq \alpha 1 \leq 0.1$, $0.03 \leq \beta 1 \leq 0.08$, $0.55 \leq \gamma 1 \leq 0.65$, $0.25 \leq \eta 1 \leq 0.35$, $0.06 \leq \alpha 1 + \beta 1 \leq 0.13$, $\alpha 1 + \beta 1 + \gamma 1 + \eta 1 = 1$, Mb is at least one kind of Ag or Zn).

More preferably, the aforesaid composition satisfies $0.03 \leq \alpha 1 \leq 0.1$, $0.05 \leq \beta 1 \leq 0.08$, $0.6 \leq \gamma 1 \leq 0.65$, $0.25 \leq \eta 1 \leq 0.30$, $0.06 \leq \alpha 1 + \beta 1 \leq 0.13$, $\alpha 1 + \beta 1 + \gamma 1 + \eta 1 = 1$.

In this composition range, a sufficient erasing ratio is obtainable in the overwriting operation close to 10 m/s. In addition, it can be used as a composition excellent in archival stability.

Although In shows an effect whereby the crystallization temperature increases to improve the can-stability and doping of 3 at % or more is preferable for securing the archival stability at the room temperature, the doping exceeding 8 at % easily causes the phase separation, and the segregation tends to occur due to the repeated overwriting operation. More preferably, it is in a range from 5 at % to 8 at %.

Ag or Zn facilitates the initialization of an amorphous film immediately after the deposite. Depending on the initializing method, the doping below 10 at % works sufficiently, and the excessive doping impairs the archival stability and, hence, it is not preferable.

In addition, if Ag or Zn plus In exceeds 13 at % in total, the segregation tends to occur in the repeated overwriting operation and, hence, it is not desirable.

As another appropriate example of the recording layer 52, there is a composition of $Mc_vGe_y(Sb_xTe_{1-x})_{1-y-v}$ (where $0.6 \leq x \leq 0.8$, $0.01 \leq y \leq 0.15$, $0 \leq v \leq 0.15$, $0.02 \leq y+v \leq 0.2$, Mc is at least one kind of Ag or Zn).

With this composition, it is possible to improve the facilitation of precipitation of a low melting point metal In and an In-alloy in the aforesaid MbInSbTe alloy, However, the initializing process suddenly takes time in conjunction with the doping of Ge.

In order to overcome both facilitation of precipitation of In and difficulty of initialization due to Ge, it is also possible to employ a composition of $Md\alpha_2In\beta_2Ge\delta_2Sb\gamma_2Te\eta_2$ (where $0 \leq \alpha 2 \leq 0.1$, $0.001 \leq \beta 2 \leq 0.1$, $0.01 \leq \delta 2 \leq 0.1$, $0.5 \leq \gamma 2 \leq 0.8$, $0.15 \leq \eta 2 \leq 0.4$, $0.03 \leq \beta 2 + \delta 2 \leq 0.15$, $\alpha 2 + \beta 2 + \delta 2 + \gamma 2 + \eta 2 = 1$, Mb is at least one kind of Ag or Zn).

It is preferable that the thickness of the recording layer 52 is in a range from 10 nm to 30 nm. When the thickness of the recording layer 52 is lower than 10 nm, difficulty is encountered in provide sufficient contrast between the reflectances of the crystalline and the amorphous state, and the crystallization speed tends to reduce to make it difficult to erase the recording for a short time. On the other hand, when it exceeds 30 nm, likewise it becomes difficult to provide the optical contrast, and cracks tend to occur, so this is not preferable.

In addition, in the case below 10 nm, the reflectance drops excessively, and in the case of above 30 nm, the heat capacity increases to deteriorate the recording sensitivity. Still additionally, if the film thickness of the recording layer 52 is higher than 30 nm, a change of volume occurs significantly in conjunction with a change of phase so that the repeated change of volume due to the repeated overwriting operation has a great effect on the recording layer 52 itself and the upper and lower protective layers 51 and 53 to cause microscopic and irreversible deformation accumulates to crease noises. In consequence, the repeated overwrite durability falls. In a high-density recording medium such as a rewritable DVD (rewritable compact disk), severer requirements are imposed on noises, and more preferably, it is below 25 nm.

In many cases, for the recording layer 52, the alloy target is obtained through the DC (Direct Current) or RF (Radio Frequency) sputtering in an inactive gas, particularly an Ar gas.

Moreover, the density of the recording layer 52 is desirable to be equal to or more than 80% of the bulk density, and more preferably, it is 90% or more. In this case, although, as a matter of course, the bilk density can be measured actually by producing an alloy block, it is also possible to use the approximate value obtained in a manner that, in the above-mentioned equation (9) the at % of each element is substituted for the mol concentration of each component and the bulk density is substituted for the molecular weight of each element.

In the sputtering deposit method, for the density of the recording layer 52, there is a need to increase the high-energy Ar quantity to be applied to the recording layer 52, for example, by disposing a substrate in the vicinity of the front of the target to lower the pressure of the sputtering gas (rare gas such as Ar). In the case of the high-energy Ar, either a portion of the Ar ion applied to the target for sputtering is rebounded to reach the substrate side, or the Ar ion in the plasma is accelerated by a sheath voltage of the entire surface of the substrate to reach the substrate. Such high-energy rare gas irradiation effect is called the atomic peening effect.

In the case of the sputtering in the Ar gas used commonly, Ar is mixed into the sputter film owing to the atomic peening effect. On the basis of the Ar quantity in the film, it is possible to estimate the atomic peening effect. That is, when the Ar quantity is small, this signifies that the high-energy Ar irradiation effect is little, and there is a tendency of forming a non-dense film. On the other hand, if the Ar quantity is large, the high-energy Ar irradiation becomes intensive and the density becomes high, whereas Ar introduced into the film forms voids to develop the deposition in the repeated overwriting operation, thus impairing the repeated durability.

An appropriate Ar quantity in the recording layer film is equal to or more than 0.1 at % but less than 1.5 at %. In the case of the use of the radio-frequency sputtering rather than the direct current sputtering, this desirably reduces the Ar quantity in the film and provides a high-density film.

For the reflective film 54, a substance having a high reflectance is preferable, and the present invention employs a high-reflectance metal such as Au, Ag or Al, or an alloy containing this metal as a main component, particularly having a high heat conductivity, by which a heat radiating effect is expectable even through the upper dielectric layer. For improving the heat conduction and corrosion resistance of the reflective layer itself, an alloy is preferable which is coped with a small amount of Ta, Ti, Cr, Mo, Mg, V, Nb, Zr, Mn, Si or the like, for example, 15 at % and below. Particularly, an alloy Al1-zTaz (0<z≦0.15) shows an excellent corrosion resistance, and is effective for improving the reliability of this optical recording medium.

It is preferable that the film thickness of the reflective layer 54 is equal to or more than 50 nm from the viewpoint of fully reflecting the incident light without producing the transmission light. If the film thickness exceeds 500 nm, this does not have the heat radiating effect, and deteriorates the productivity in vain and further causes easy occurrence of cracks, and therefore, it is preferable that the film thickness is set below 500 nm. In particular, in a case in which the film thickness of the upper protective layer 53 is in a range from 40 nm to 50 nm, the quantity of the impurity contained is set below 2 at % in order to provide a high heat conductivity to the reflective layer 54.

The recording layer 52, the protective layers 51, 53 and the reflective layer 54, described above, can be made by the sputtering.

In view of the prevention of oxidation or contamination between the layers, it is preferable that, with respect to a recording layer target, a protective layer target and, when needed, a reflective layer material target, the film formation is made in an in-line apparatus installed in the same vacuum chamber. In addition, this is superior in productivity.

Furthermore, a description will be given of a method of initializing the optical recording medium according to the present invention.

In the optical recording medium according to the present invention, since the recording layer 52 shows an amorphous state as the as-deposited state (state immediately after deposite), there is a need to crystallize the entire surface of the disk for the purpose of the initialized state being set as the crystalline. This process is called an initial crystallization. Usually, this initial crystallization is accomplished in a manner that the disk being in a rotating condition is irradiated with a laser beam focused into a dimension of approximately several tens to hundred microns.

In particular, for shortening the time needed for the initialization and for surely achieving the initialization by one-time optical beam irradiation, melting initialization is an available means. Incidentally, as long as the sandwich structure is maintained with the protective layers 51 and 53, the melting does not damage the recording medium immediately.

For example, if it is locally heated using an optical beam (gas or semiconductor laser light) focused to have a diameter of approximately 10 to several hundreds um or an optical beam focused into an elliptical configuration having a major axis of approximately 50 to several hundreds μm and a minor axis of approximately 1 to 10 μm to melt only the portion corresponding to the beam central portion, then the damage of the recording medium is avoidable. In addition, the melted portion is additionally heated by heat of the beam peripheral portion, thus decreasing the cooling rate to achieve excellent crystallization. The use of this method enables shortening the initialization time to 1/10 of that of the conventional solid crystallization and shortening the productivity considerably, and preventing the variation of crystalline at erasing after the overwriting operation.

[Embodiments]

The present invention will be described hereinbelow through the use of embodiments. However, the invention is not limited to the embodiments, provided that it do not constitute departures from the spirit and scope of the invention.

(Embodiment 1)

An optical disk master was produced using the above-described exposure methods 1 and 2. That is, a range having a diameter of 46 to 54 mm was set as a ROM area, and pre-pits, whose depth is set at 80 nm and whose width is at 0.60 μm, were made which retains address information based on a wobble 90 according to the orange book standard, and further a range having a diameter of 54 to 116 mm was set as a RAM area, and even a guide groove, whose depth is at 40 nm and whose width is at 0.550 μm, was made which retains address information based on wobble according to the orange book standard. The pre-pit string and the guide groove were connected into a spiral configuration, and the track pitch was set at 1.6 μm.

According to the exposure method 1, in the exposure system shown in FIG. 13, Kr having a wavelength of 413 nm was used for laser light and the laser light was applied through an objective lens, whose numerical aperture NA is 0.90, onto the substrate which is in rotation at a linear velocity of 1.2 m/s. A pit forming beam 13 was set to have a diameter of approximately 0.26 μm while groove forming beams 19 and 22 were set to have a diameter of approximately 0.3 μm, and the distance between the beams 19 and 22 was set to be 0.2 μm.

According to the exposure method 2, in the exposure system shown in FIG. 13, Kr having a wavelength of 413 nm was used for laser light and the laser light was applied through an objective lens, whose numerical aperture NA is 0.90, onto the substrate which is in rotation at a linear velocity of 1.2 m/s. A pit forming beam 13 was set to have a diameter of approximately 0.26 μm while a groove forming beam 22 was set to have a diameter of approximately 0.3 μm, and the beam 22 was angle-deflected at an angle of 10 mrad and at 5 MHz.

A stamper was produced through the use of the optical disk master made according to the above-mentioned methods, and a disk substrate with a diameter of 120 mm was prepared by means of the injection molding of polycarbonate.

The formation was made in the following conditions using the disk making machine MO40DH manufactured by Nissei Resin Industry Co., Ltd. That is, the resin temperature was set at 350° C., the stamper side (fixed side) mold temperature was at 112° C., the movable side mold temperature was at 107° C., the spool temperature was at 100° C., while the cut punch temperature was at 105° C., and further the filling speed was set at 80 mm/sec, the clamping force was at 36 tons and the cooling time was at 6.8 seconds.

A protective layer having a thickness of 110 nm and made of $(ZnS)_{80}(SiO_2)_{20}$, a recording layer having a thickness of 16 nm and made of $Ag_5In_5Sb_{60.5}Te_{29.5}$, a protective layer having a thickness of 44 nm and made of $(ZnS)_{85}(SiO_2)_{15}$, and a reflective layer having a thickness of 222 nm and made of $Al_{99.5}Ta_{0.5}$ were successively film-formed on the substrate within a clean vacuum chamber air-discharged into a high vacuum condition. Lastly, in order to preventing the deformation of the foregoing recording medium, an ultraviolet-curing resin film was formed to have a thickness of several μm.

With respect to this optical recording medium, using an objective lens whose NA is 0.50 and a laser whose wavelength is 780 nm, the groove signal characteristics in the ROM area and before and after the recording in the RAM area and further the retrieved signal characteristics in the ROM area and after the recording in the RAM area were evaluated under the conditions that the retrieving power was 0.8 mW and the linear velocity was 1.2 m/s.

In the RAM area, a random pattern of an EFM signal was recorded using an objective lens whose NA is 0.50 and a laser whose wavelength is 780 nm, under the conditions that the recording power was 13 mW and the linear velocity was 2.4 m/s, and this was taken as the RAM area after the recording and the evaluation was made thereon.

Table-i shows, in the ROM area and in the RAM area before and after the recording, values (PP) of push pull signals, values (RC) of radial contrast, CNR values (WCNR) of wobble signals, values (NWS) of normalized wobble signals, maximum reflectances $R_{top}$ (%), modulation amplitudes $m_{11}$ (m) of 11T signals of EFM signals, and asymmetry values (Asym).

In this case, the values PP of push pull signals in the ROM area and before and after the recording signify a value $|I_1-I_2|_{ROM}/I_{topROM}$ of a push pull signal of the ROM area normalized with the maximum signal level, a value $|I_1-I_2|/I_g$ of a push pull signal before recording normalized with a groove signal level in the RAM area, and a value $|I_1-I_2|_a/I_{topRAM}$ of a push pull signal after recording normalized with the maximum signal level in the RAM area.

Table-2 shows the ratios of push pull signals of the ROM area and of the RAM area before the recording, and the ratios of the maximum reflectances.

These show the evaluation results of an optical disk manufactured through the use of an optical disk original form produced according to the exposure methods 1 and 2.

TABLE 1

|  |  | PP | RC | WCNR | NWS | R % | m | Asym |
|---|---|---|---|---|---|---|---|---|
| ROM Area |  | 0.068 | 0.404 | 31.6 | 0.052 | 22.9 | 0.620 | −0.095 |
| Exposure Method 1 | RAM Area (Before Recording) | 0.133 | 0.133 | 36.8 | 0.052 | — | — | — |
|  | RAM Area (After Recording) | 0.084 | 0.385 | 29.3 | — | 17.0 | 0.630 | −0.033 |
| Exposure Method 2 | RAM Area (Before Recording) | 0.132 | 0.130 | 36.0 | 0.044 | — | — | — |
|  | RAM Area (After Recording) | 0.083 | 0.465 | 34.1 | — | 19.4 | 0.692 | −0.023 |

TABLE 2

|  | $(|I_1-I_2|/I_g)/(|I_1-I_2|_a/I_{ga})$ | $|I_1-I_2|/|I_1-I_2|_a$ | $|I_1-I_2|_a/|I_1-I_2|_{ROM}$ | $R_{topROM}/R_{topRAM}$ |
|---|---|---|---|---|
| Exposure Method 1 | 1.08 | 1.70 | 1.01 | 1.35 |
| Exposure Method 2 | 1.10 | 1.77 | 1.03 | 1.18 |

In addition, the ratio $(m_3/m_{11})ROM$ of the modulation amplitude $m_3$ of a 3T signal to the modulation amplitude $m_{11}$ of a 11T signal in the ROM area 104 was 0.56. Still additionally, the ratio $(m_3/m_{11})_{RAM}$ of the modulation amplitude $m_3$ of a 3T signal to the modulation amplitude $m_{11}$ of a 11T signal in the RAM area 105 after the recording according to the exposure method 1 was 0.55. Moreover, the ratio $(m_3/m_{11})$ RAM of the modulation amplitude $m_3$ of a 3T signal to the modulation amplitude $m_{11}$ of a 11T signal in the RAM area 105 after the recording according to the exposure method 2 was 0.55.

(Comparative Example 1)

In this comparative example 1, the pit depth Pd of the ROM area 104 was set at 129 nm and the width was set at 0.52 μm, with the pit 60 being made deeper than that in the above-described embodiment 1. The RAM area 105 was made to have the same configuration as that in the aforesaid embodiment 1.

At this time, the ratio $|I_1-I_2|_a/|I_1-I_2|_{ROM}$ of a value of a push pull signal after the recording in the RAM area 105 to a value of a push pull signal in the ROM area 104 was 175/39=4.49. Thus, the ratio deviated largely from the range from 0.78 to 1.3, which is considered to be a preferable range of the ratio $|I_1-I_2|_a/|_{ROM}$ of a value of a push pull signal after the recording in the RAM area 105 to a value of a push pull signal in the ROM area 104 in the above-described embodiment. In addition, the modulation amplitude $m_{11}$ of a 11T signal in the ROM area 104 was 0.84 ($m_{11}$=0.84). Still additionally, the radial contrast value RC in the ROM area 104 was 0.48 (RC=0.48).

In consequence, the tracking has no useful function at the change-over portion between the RAM area 105 and the ROM area 104.

(Comparative Example 2)

In this comparative example 2, the pit depth Pd of the ROM area 104 was set at 107 nm and the pit width Pw was set at 0.42 µm, with the pit 60 being made deeper than that in the above-described embodiment 1 and the pit width Pw was made narrower. The RAM area 105 was made to have the same configuration as that in the aforesaid embodiment 1. In this case, since the value of a push pull signal in the ROM area 104 was low in the above-mentioned comparative example 1, the pit width Pw was made narrower in order to increase that value.

At this time, the ratio $|I_1-I_2|_a/|I_1-I_2|_{ROM}$ of a value of a push pull signal after the recording in the RAM area 105 to a value of a push pull signal in the ROM area 104 was 175/79=2.22. Thus, the ratio still deviated largely from the range from 0.78 to 1.3, which is considered to be a preferable range of the ratio $|I_1-I_2|_a/|I_1-I_2|_{ROM}$ of a value of a push pull signal after the recording in the RAM area 105 to a value of a push pull signal in the ROM area 104 in the above-described embodiment. In addition, the modulation amplitude $m_{11}$ of a 11T signal in the ROM area 104 was 0.81 ($m_{11}$=0.81). Still additionally, the radial contrast value RC in the ROM area 104 was 0.43 (RC=0.43).

In consequence, the tracking did not perform a function at the change-over portion between the RAM area 105 and the ROM area 104.

(Embodiment 2)

In this embodiment 2, the pit depth Pd in the ROM area 104 was set at 57 nm and the pit width Pw was set at 0.56 µm, with the pit being made shallower than that in the above-mentioned embodiment 1. The RAM area 105 was formed as in the above-mentioned embodiment 1.

At this time, the ratio $|I_1-I_2|_a/|I_1-I_2|_{ROM}$ of a value of a push pull signal after the recording in the RAM area 105 to a value of a push pull signal in the ROM area 104 was 175/181=0.97. Thus, the ratio fitted into the range from 0.78 to 1.3, which is considered to be a preferable range of the ratio $|I_1-I_2|_a/|I_1-I_2|_{ROM}$ of a value of a push pull signal after the recording in the RAM area 105 to a value of a push pull signal in the ROM area 104 in the above-described embodiment. In consequence, the tracking did not come out of action at the change-over portion between the RAM area 105 and the ROM area 104.

However, the modulation amplitude $m_{11}$ of a 11T signal in the ROM area 104 was 0.40 ($m_{11}$=0.40). Since the modulation amplitude $m_{11}$ of a 11T signal was thus low, difficulty is experienced in reading out a precise pattern of each signal, resulting in difficulty in making satisfactory retrieving.

In addition, the radial contrast value RC in the ROM area 104 was 0.17 (RC=0.17). Since the radial contrast value RC was thus low, the track counting is hard to perform, and the normal seek becomes difficult.

(Comparative Example 3)

In this comparative example 3, the groove depth Gd of the RAM area 105 was set at 24 nm and the groove width Gw was set at 0.38 µm, with the groove 61 being made shallower than that in the above-described embodiment 1 and the groove width Gw was made narrower. The ROM area 104 was made to have the same configuration as that in the aforesaid embodiment 1. The recording power was set at 10.3 mW.

At this time, the ratio $|I_1-I_2|/|I_1-I_2|_a$ of a value of a push pull signal before the recording in the RAM area 105 to a value of a push pull signal after the recording in the RAM area was 1.56. In addition, the ratio $|I_1-I_2|_a/|I_1-I_2|_{ROM}$ of a value of a push pull signal after the recording in the RAM area 105 to a value of a push pull signal in the ROM area was 488/177=2.76. Thus, the ratio deviated largely from the range from 0.78 to 1.3, which is considered to be a preferable range of the ratio $|I_1-I_2|_a/|I_1-I_2|_{ROM}$ of a value of a push pull signal after the recording in the RAM area 105 to a value of a push pull signal in the ROM area 104 in the above-described embodiment. For this reason, the tracking did not perform a function at the change-over portion between the RAM area 105 and the ROM area 104.

In addition, the modulation amplitude $m_{11}$ of a 11T signal in the RAM area 105 was 0.54 ($m_{11}$=0.54). Since the modulation amplitude $m_{11}$ of a 11T signal was thus low, even if retrieving was made with respect to only the RAM area 105, difficulty is experienced in reading out a precise pattern of each signal, resulting in difficulty of making satisfactory retrieving.

Still additionally, the radial contrast value RC in the RAM area 105 was 0.37 (RC=0.37). Moreover, the maximum reflectance $R_{topRAM}$ in the RAM area 105 was 20.8% ($R_{top}$=20.8%), and the maximum reflectance $R_{topROM}$ in the ROM area 104 was 22.9% ($R_{topRAM}$=22.9). Accordingly, $R_{topROM}/R_{topRAM}$=22.9/20.8=1.10.

(Comparative Example 4)

In this comparative example 4, the groove depth Gd of the RAM area 105 was set at 74 nm and the groove width Gw was set at 0.48 µm, with the groove 61 being made deeper than that in the above-described embodiment 1. The ROM area 104 was made to have the same configuration as that in the aforesaid embodiment 1. The recording power was set at 12 mW.

At this time, the ratio $|I_1-I_2|/|I_1-I_2|_a$ of a value of a push pull signal before the recording in the RAM area 105 to a value of a push pull signal after the recording in the RAM area was 2.41. In addition, the ratio $|I_1-I_2|_a/|I_1-I_2|_{ROM}$ of a value of a push pull signal after the recording in the RAM area 105 to a value of a push pull signal in the ROM area was 693/177=3.92. Thus, the ratio deviated largely from the range from 0.78 to 1.3, which is considered to be a preferable range of the ratio $|I_1-I_2|_a/|I_1-I_2|_{ROM}$ of a value of a push pull signal after the recording in the RAM area 105 to a value of a push pull signal in the ROM area 104 in the above-described embodiment. For this reason, the tracking did not perform a function at the change-over portion between the RAM area 105 and the ROM area 104.

In addition, the modulation amplitude $m_{11}$ of a 11T signal in the RAM area 105 was 0.67 ($m_{11}$=0.67). Moreover, the maximum reflectance $R_{topRAM}$ in the RAM area 105 was 13.3% ($R_{top}$=13.3%), and the maximum reflectance $R_{topROM}$ in the ROM area 104 was 22.9% ($R_{topRAM}$=22.9%). Accordingly, $R_{topROM}/R_{topRAM}$=22.9/13.3=1.72.

Thus, since the both the areas differ largely in $R_{topROM}/R_{topRAM}$, the gain adjustment takes a long time, which makes it difficult to achieve the continuous retrieving with respect to both the areas.

INDUSTRIAL APPLICABILITY

As described above, with the rewritable compact disk and manufacturing method thereof according to the present invention, it is possible to provide a high-intechangeability rewritable optical disk in which a RAM area and a ROM area exist on one medium surface. Accordingly, it is possible to make the utilization of application software or the like and the recording data simultaneously through the use of one CD-RW writer. This offers an extremely high utility value.

What is claimed is:

1. A rewritable compact disk having at least a phase-change recording layer (52) on a substrate (50), characterized in that a recordable, erasable and retrievable RAM area (105) and a ROM area (104) available only for retrieving are provided on the same disk surface, said phase-change recording layer is formed in each of said RAM area and said ROM area, a groove (61) having a wobble is made in said RAM area, and a crystalline portion of said phase-change recording layer is made as a non-recorded state/erased state while an amorphous portion thereof is made as a recorded state, with irradiation being carried out with recording light so that an amorphous mark is formed in said groove to record EFM information, in said ROM area, EFM information is recorded in the form of a pre-pit string (60), and when measured using a wavelength of 770 to 790 nm and an optical pickup whose objective lens numerical aperture is 0.49 to 0.51, a ratio $|I_1-I_2|/|I_1-I_2|_a$ of values of push pull signals before and after recording of an EFM signal in said RAM area is in a range from 1.05 to 2.0.

2. A rewritable compact disk according to claim 1, characterized in that a ratio $|I_1-I_2|_a/|I_1-I_2|_{ROM}$ of a value of a push pull signal after recording in said RAM area (105) to a value of a push pull signal in said ROM area (104) is in a range from 0.78 to 1.3.

3. A rewritable compact disk having at least a phase-change recording layer (52) on a substrate (50), characterized in that a recordable, erasable and retrievable RAM area (105) and a ROM area (104) available only for retrieving are provided on the same disk surface, said phase-change recording layer is formed in each of said RAM area and said ROM area, a groove (61) having a wobble is made in said RAM area, and a crystalline portion of said phase-change recording layer is made as a non-recorded state/erased state while an amorphous portion thereof is made as a recorded state, with irradiation being carried out with recording light so that an amorphous mark is formed in said groove to record EFM information, in said ROM area, EFM information is recorded in the form of a pre-pit string (60), and when measured using a wavelength of 770 to 790 nm and an optical pickup whose objective lens numerical aperture is 0.49 to 0.51, a ratio $|I_1-I_2|_a/|I_1-I_2|_{ROM}$ of a value of a push pull signal after recording in said RAM area to a value of a push pull signal in said ROM area is in a range from 0.78 to 1.3.

4. A rewritable compact disk according to claim 1, characterized in that a modulation amplitude of a 11T signal of an EFM signal in said ROM area (104) is in a range from 0.55 to 0.95.

5. A rewritable compact disk according to claim 1, characterized in that a ratio $(m_3/m_{11})_{ROM}$ of a modulation amplitude of a 3T signal of an EFM signal to a modulation amplitude of a 11T signal thereof in said ROM area (104) is equal to or more than 0.45.

6. A rewritable compact disk according to claim 1, characterized in that a modulation amplitude of a 11T signal of an EFM signal in said RAM area (105) is in a range from 0.60 to 0.90.

7. A rewritable compact disk according to claim 1, characterized in that a ratio $(m_3/m_{11})$ R of a modulation amplitude of a 3T signal of an EFM signal to a modulation amplitude of a 11T signal thereof in said RAM area (105) is equal to or more than 0.45.

8. A rewritable compact disk according to claim 1, characterized in that a ratio $R_{topROM}/R_{topRAM}$ of maximum reflectances of said ROM area (104) and said RAM area (105) is in a range from 0.7 to 1.45.

9. A rewritable compact disk according to claim 1, characterized in that a radial contrast value in said ROM area (104) is in a range from 0.30 to 0.60.

10. A rewritable compact disk according to claim 1, characterized in that a pre-pit string (60) in said ROM area (104) has an wobble (90).

11. A rewritable compact disk according to claim 10, characterized in that a normalized wobble signal NWSROM obtained from said wobble (90) in said ROM area (104) is in a range from 0.035 to 0.060.

12. A rewritable compact disk according to claim 1, characterized in that a pre-pit string (60) in said ROM area (104) has a pit depth of 60 to 100 nm and a pit width of 0.45 to 0.70 μm.

13. A rewritable compact disk according to claim 1, characterized in that a wobble groove (61) in said RAM area (105) has a groove depth of 30 to 50 nm and a groove width of 0.40 to 0.60 μm.

14. A method of manufacturing a rewritable compact disk, comprising carrying out irradiation with laser light for exposure according to a pre-pit string and groove to be made in a photoresist film (81) formed on a substrate (80) and developing said photoresist film for producing a master having the formed pre-pit string and groove, producing a stamper on the basis of said master, forming a substrate (50) having said pre-pit string (60) and said groove (61) on the basis of said stamper, and forming a phase-change recording layer (52) thereon, characterized in that, for manufacturing a rewritable compact disk according to claim 1, in irradiating said photoresist film with said laser light according to said groove, the irradiation is carried out with a plurality of laser beams for the exposure so that the adjacent laser beams partially overlap in a direction perpendicular to a traveling direction of said laser light.

15. A method of manufacturing a rewritable compact disk, comprising carrying out irradiation with laser light for exposure according to a pre-pit string and groove to be made in a photoresist film (81) formed on a substrate (80) and developing said photoresist film for producing a master having the formed pre-pit string and groove, producing a stamper on the basis of said master, forming a substrate (50) having said pre-pit string (60) and said groove (61) on the basis of said stamper, and forming a phase-change recording layer thereon, characterized in that, for manufacturing a rewritable compact disk according to claim 1, in irradiating said photoresist film with said laser light according to said groove, the irradiation for the exposure is carried out while oscillations are made $2.5 \times 10^6$ times/m or more but $25 \times 10^6$ times/m or less in directions perpendicular to a traveling direction of said laser light.

* * * * *